(12) United States Patent
Fukunaga

(10) Patent No.: US 10,558,795 B2
(45) Date of Patent: Feb. 11, 2020

(54) INFORMATION PROCESSING APPARATUS, INFORMATION PROCESSING SYSTEM, AND METHOD OF PROCESSING INFORMATION

(71) Applicant: Munetake Fukunaga, Tokyo (JP)

(72) Inventor: Munetake Fukunaga, Tokyo (JP)

(73) Assignee: RICOH COMPANY, LTD., Tokyo (JP)

(*) Notice: Subject to any disclaimer, the term of this patent is extended or adjusted under 35 U.S.C. 154(b) by 120 days.

(21) Appl. No.: 15/802,564

(22) Filed: Nov. 3, 2017

(65) Prior Publication Data
US 2018/0129800 A1    May 10, 2018

(30) Foreign Application Priority Data
Nov. 10, 2016 (JP) ................. 2016-219661

(51) Int. Cl.
*G06F 21/00* (2013.01)
*G06F 21/44* (2013.01)
*G06F 3/14* (2006.01)
*G06F 21/62* (2013.01)
*H04L 29/06* (2006.01)
(Continued)

(52) U.S. Cl.
CPC ............ *G06F 21/44* (2013.01); *G06F 3/1454* (2013.01); *G06F 21/6218* (2013.01); *H04L 63/10* (2013.01); *G06F 21/32* (2013.01); *G09G 2370/16* (2013.01); *H04N 1/00129* (2013.01)

(58) Field of Classification Search
CPC ............. G06F 2203/0381; G06F 3/167; G06F 3/0488; G06F 3/03545; G06F 3/018; G06F 17/275; G06F 16/3329; G06F 3/04883; G06F 3/0237; G06F 17/245;
(Continued)

(56) References Cited

U.S. PATENT DOCUMENTS 6,404,856 B1* 6/2002 Wilcox ............... G11B 27/105
379/67.1
9,658,703 B2* 5/2017 Son ..................... G06F 3/0488
(Continued)

FOREIGN PATENT DOCUMENTS

JP    2015-041373    3/2015

*Primary Examiner* — Edgar X Guerra-Erazo
(74) *Attorney, Agent, or Firm* — Harness, Dickey & Pierce, P.L.C.

(57) ABSTRACT

An information processing apparatus includes a memory to store drawing data including stroke information, generated in response to a handwriting operation, and audio data collected by a terminal apparatus, the audio data being associated with user identification information identifying a user of the terminal apparatus, and circuitry to acquire the drawing data acquired at a specific time point and the audio data collected in a data-acquiring period including the specific time point, transmit the audio data and a request for converting the acquired audio data to a language processing apparatus into first text data, acquire the first text data from the language processing apparatus, compare the stroke information of the drawing data and the first text data to determine whether the stroke information matches the first text data, and convert handwritten-information indicated by the stroke information to second text data when the stroke information matches the first text data.

23 Claims, 17 Drawing Sheets

(51) Int. Cl.
*G06F 21/32* (2013.01)
*H04N 1/00* (2006.01)

(58) Field of Classification Search
CPC . G06F 3/0416; G06F 3/0481; G06K 9/00422;
G06K 9/00436
See application file for complete search history.

(56) References Cited

U.S. PATENT DOCUMENTS

| | | | |
|---|---|---|---|
| 2002/0027976 A1* | 3/2002 | Wilcox | G11B 27/105 379/67.1 |
| 2009/0098893 A1* | 4/2009 | Huang | H04M 1/72547 455/466 |
| 2009/0251337 A1* | 10/2009 | Marggraff | G06F 3/03545 341/20 |
| 2014/0098047 A1* | 4/2014 | Son | G06F 3/0488 345/173 |
| 2014/0361983 A1* | 12/2014 | Dolfing | G06F 3/04883 345/156 |
| 2014/0363082 A1* | 12/2014 | Dixon | G06K 9/00402 382/187 |
| 2015/0054968 A1 | 2/2015 | Murata | |
| 2017/0255284 A1* | 9/2017 | Son | G06F 3/0488 |

\* cited by examiner

FIG. 6

CONFERENCE MANAGEMENT INFORMATION DATABASE (DB)

210

| CONFERENCE ID | CONFERENCE NAME | TERMINAL ID |
|---|---|---|
| 001 | MARKETING STRATEGY | 01,02,03,05 |
| 002 | INVENTION RESEARCH | 01,02,03,04,05 |
| 003 | SALES CONFERENCE | |
| ⋮ | ⋮ | ⋮ |

FIG. 7

CONFERENCE INFORMATION DATABASE (DB)

220

| CONFERENCE ID | TERMINAL ID | COLLECTION DATA |
|---|---|---|
| 002 | 01 | AUDIO DATA 1 |
| | 02 | AUDIO DATA 2 |
| | 03 | AUDIO DATA 3 |
| | 04 | AUDIO DATA 4 |
| | 05 | AUDIO DATA 5 |
| | | SCREEN DRAWING DATA 1 |
| | | SCREEN DRAWING DATA 2 |
| | | SCREEN DRAWING DATA 3 |

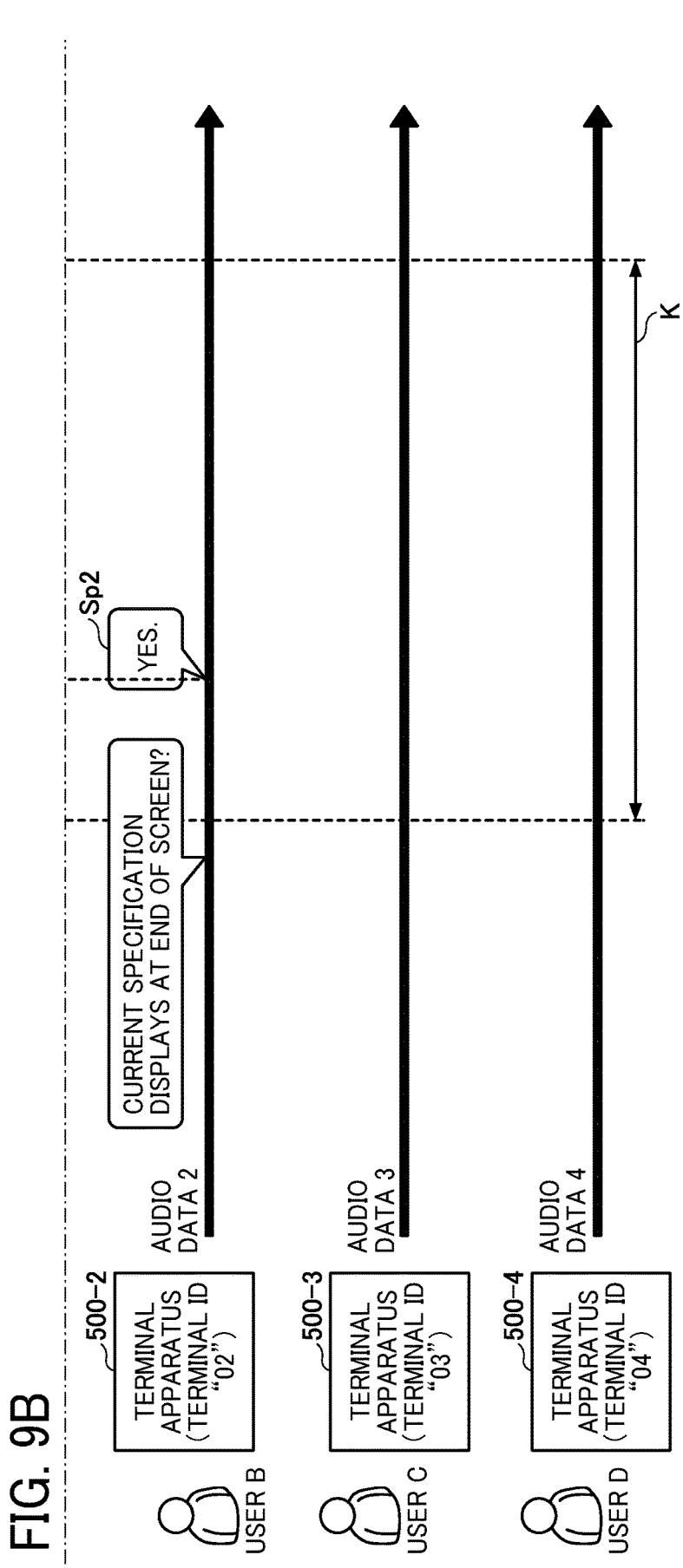

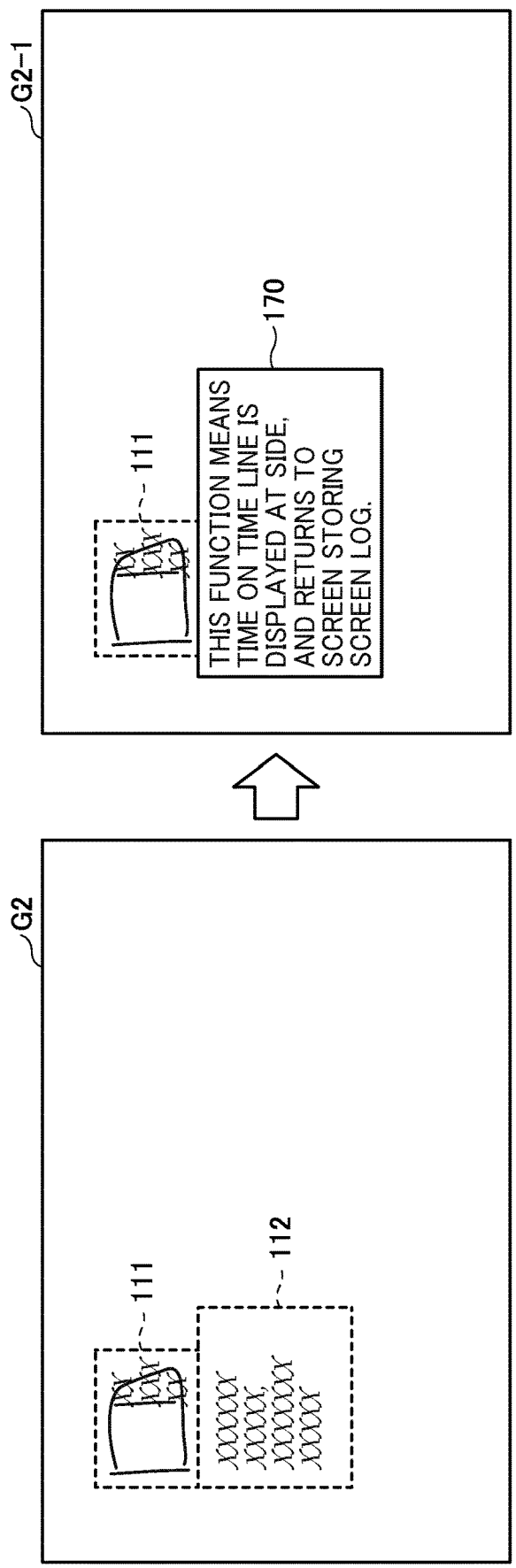

INFORMATION PROCESSING APPARATUS, INFORMATION PROCESSING SYSTEM, AND METHOD OF PROCESSING INFORMATION

CROSS-REFERENCE TO RELATED APPLICATION

This application claims priority pursuant to 35 U.S.C. § 119(a) to Japanese Patent Application No. 2016-219661 filed on Nov. 10, 2016 in the Japan Patent Office, the disclosure of which is incorporated by reference herein in its entirety.

BACKGROUND

Technical Field

This disclosure relates to an information processing apparatus, an information processing system, and a method of processing information.

Background Art

Lately, electronic information boards known as interactive whiteboard boards (IWB) are used for sharing information such as written information as image data between a plurality of participants participating in a conference, a lecture, a lesson or the like, and the image data displayed on the IWB can be stored.

For example, when the electronic information board is used in a conference, image data displayed on the electronic information board can be stored as minutes of the proceedings of the conference. In this case, characters input by a handwriting operation of a user on the electronic information board are stored as image data. The stored image data includes, for example, data of characters and others input as scribble on the electronic information board, which is difficult to recognize or identify as the characters.

SUMMARY

As one aspect of the present invention, an information processing apparatus is devised. The information processing apparatus includes a memory to store drawing data including stroke information, generated in response to a handwriting operation on an input device disposed for an image drawing apparatus, and audio data collected by a terminal apparatus, the audio data being associated with user identification information identifying a user of the terminal apparatus; and circuitry to acquire, from the memory, the drawing data acquired at a specific time point and the audio data collected in a data-acquiring period, the data-acquiring period including the specific time point when the drawing data is acquired, transmit the audio data and a request for converting the acquired audio data to a language processing apparatus to convert the audio data into first text data, acquire the first text data from the language processing apparatus, compare the stroke information of the acquired drawing data and the first text data to determine whether the stroke information matches the first text data, and convert handwritten-information indicated by the stroke information to second text data based on a determination that the stroke information matches the first text data.

As another aspect of the present invention, an information processing system including a plurality of apparatuses is devised. The information processing system includes a memory to store drawing data including stroke information, generated in response to a handwriting operation on an input device disposed for an image drawing apparatus, and audio data collected by a terminal apparatus, the audio data being associated with user identification information identifying a user of the terminal apparatus, and circuitry to acquire, from the memory, the drawing data acquired at a specific time point and the audio data collected in a data-acquiring period, the data-acquiring period including the specific time point when the drawing data is acquired, transmit the audio data and a request for converting the acquired audio data to a language processing apparatus to convert the audio data into first text data, acquire the first text data from the language processing apparatus, compare the stroke information of the acquired drawing data and the first text data to determine whether the stroke information matches the first text data, and convert handwritten-information indicated by the stroke information to second text data based on a determination that the stroke information matches the first text data.

As another aspect of the present invention, a method of processing information by a plurality of apparatuses is devised. The method includes storing drawing data including stroke information, generated in response to a handwriting operation on an input device disposed for an image drawing apparatus, and audio data collected by a terminal apparatus, the audio data being associated with user identification information identifying a user of the terminal apparatus in a memory, acquiring, from the memory, the drawing data acquired at a specific time point and the audio data collected in a data-acquiring period, the data-acquiring period including the specific time point when the drawing data is acquired, transmitting the audio data and a request for converting the acquired audio data to a language processing apparatus to convert the audio data into first text data, acquiring the first text data from the language processing apparatus, comparing the stroke information of the acquired drawing data and the first text data to determine whether the stroke information matches the first text data, and converting handwritten-information indicated by the stroke information to second text data based on a determination that the stroke information matches the first text data.

BRIEF DESCRIPTION OF THE DRAWINGS

A more more complete appreciation of the description and many of the attendant advantages and features thereof can be readily obtained and understood from the following detailed description with reference to the accompanying drawings, wherein:

FIG. 6 illustrates an example of conference management information database of a conference management server of the embodiment;

FIG. 7 illustrates an example of conference information database of the embodiment;

FIGS. 9A and 9B illustrate a scheme of collecting screen drawing data;

FIG. 17 illustrates an example of text data displayed on an electronic information board.

Figure 1:
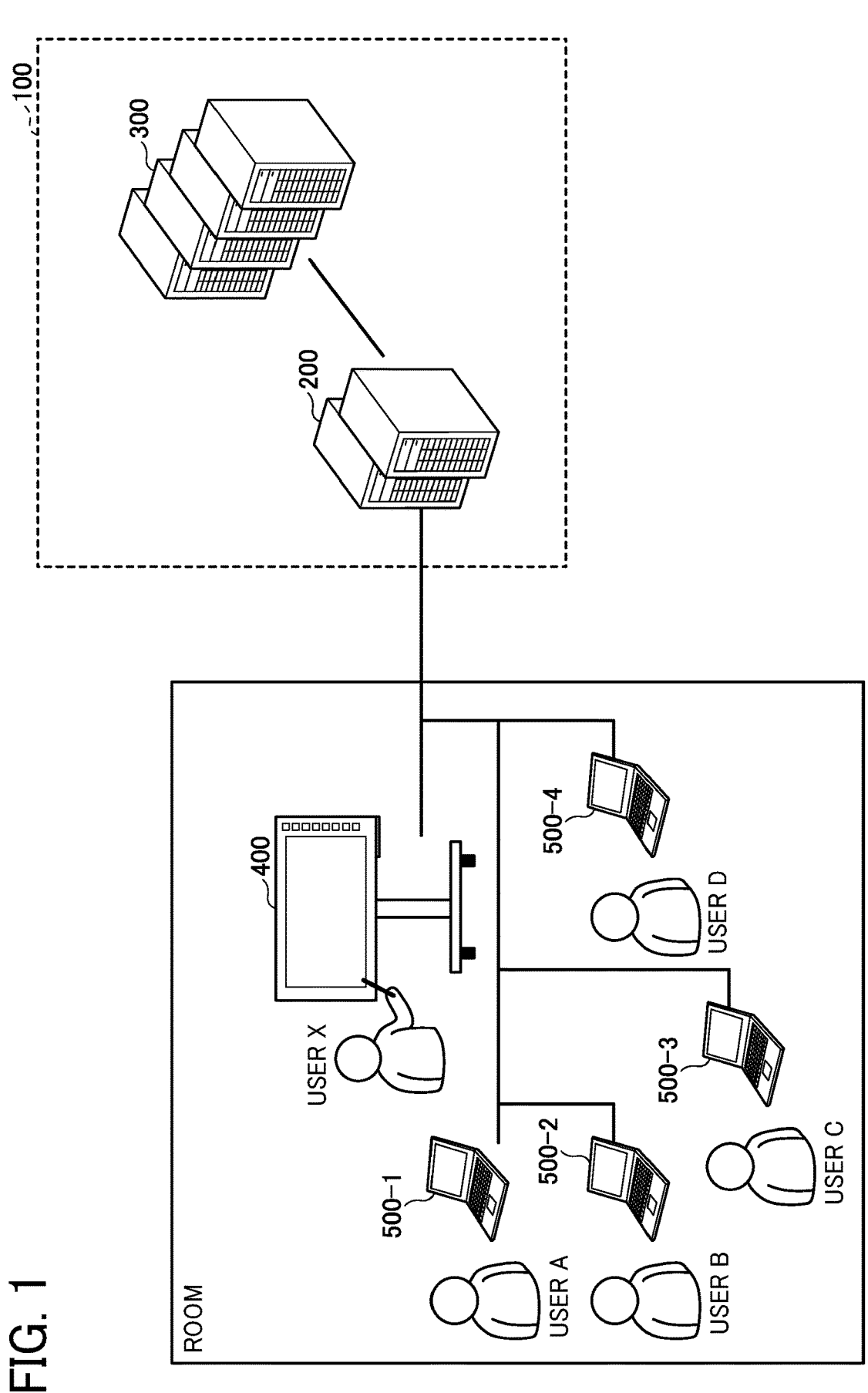
FIG. 1 illustrates an example of a schematic configuration of an information processing system of an example embodiment.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION

A description is now given of exemplary embodiments of present disclosure. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present disclosure.

In addition, it should be noted that the terminology used herein is for the purpose of describing particular embodiments only and is not intended to be limiting of the present disclosure. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof. Furthermore, although in describing views illustrated in the drawings, specific terminology is employed for the sake of clarity, the present disclosure is not limited to the specific terminology so selected and it is to be understood that each specific element includes all technical equivalents that operate in a similar manner and achieve a similar result. Referencing now to the drawings, one or more apparatuses or systems according to one or more embodiments are described hereinafter.

Hereinafter, a description is given of an embodiment of the present invention with reference to the drawings. FIG. 1 illustrates an example of a schematic configuration of an information processing system 100 of the embodiment of the present invention.

As illustrated in FIG. 1, the information processing system 100 includes, for example, a conference management server 200, and a language processing apparatus 300, in which the conference management server 200 can perform functions provided by a company such as a vendor that provides a conference support or assist service, and the language processing apparatus 300 can perform functions provided by a company such as a vendor that provides a language processing service. The conference management server 200 and the language processing apparatus 300 can be provided by one company such as one vendor or different companies such as different vendors.

In the information processing system 100, when the language processing apparatus 300 receives a request for converting audio data (e.g., voice data) included in conference information from the conference management server 200, the language processing apparatus 300 acquires the audio data (e.g., voice data) from the conference management server 200, and converts the audio data (e.g., voice data) into text data.

In an example configuration of FIG. 1, the conference management server 200 accumulates, for example, conference information of one or more conferences held in one or more locations such as one or more offices. The conference information includes, for example, a conference identification (ID) for identifying each conference, audio data (e.g., voice data) of each participant made in each conference, and information of drawing data of characters and images drawn on an electronic information board, to be described later, and the conference ID, the audio data, and the drawing data are associated with each other. The details of the conference information is described later. In this description, data of characters and images drawn on the electronic information board is referred to as the screen drawing data or drawing data.

In an example case of FIG. 1, one conference is held in one room using, for example, an electronic information board 400, and four terminal apparatuses used by four participants, in which a user A uses a terminal apparatus 500-1, a user B uses a terminal apparatus 500-2, a user C uses a terminal apparatus 500-3, and a user D uses a terminal apparatus 500-4. The number of the electronic information board 400 and the terminal apparatus 500 used in one conference is not limited any specific number.

The electronic information board 400 is used as an information drawing apparatus or image drawing apparatus such as an interactive whiteboard having a display where each user can input handwriting information such as characters and images, and the electronic information board 400 can store the characters and images input by handwriting as screen drawing data. In this example conference of FIG. 1, it is assumed that a user X, who is facilitator of the conference, writes information, which is being generated as the conference progresses, on the electronic information board 400.

The electronic information board 400 associates screen drawing data representing the information written on the electronic information board 400 with a terminal ID identifying the electronic information board 400, and a conference ID, and transmits the screen drawing data associated with the terminal ID and the conference ID to the conference management server 200 as a part of the conference information.

Further each of the terminal apparatuses 500-1, 500-2, 500-3, and 500-4 has a microphone as an audio input device used as a sound collector. Each of the terminal apparatus 500 stores audio data (e.g., voice data) input from the microphone in association with a terminal ID identifying each of the terminal apparatuses 500, and transmits the audio data associated with the terminal ID of the terminal apparatus 500 to the conference management server 200 as a part of the conference information. In other words, in the embodiment, each terminal apparatus 500 transmits the audio data (e.g., voice data) of each participant using each terminal apparatus 500, associated with the terminal ID of each terminal apparatus 500 and the conference ID, to the conference management server 200.

In the embodiment, the conference information of one conference is associated with the conference ID, and then stored in the conference management server 200.

In this specification, when the terminal apparatuses 500-1, 500-2, 500-3, and 500-4 are not distinguished, the terminal apparatuses 500-1, 500-2, 500-3, and 500-4 are simply referred to as the terminal apparatus 500.

For example, when the conference management server 200 receives a display request for text corresponding to characters included in the screen drawing data from the electronic information board 400, the conference management server 200 transmits a request for converting audio data (e.g., voice data) into text data to the language processing apparatus 300. At this timing, the audio data (e.g., voice data) is transmitted to the language processing apparatus 300 in association with the terminal ID of the apparatus such as the terminal apparatus 500 or the electronic information board 400.

The language processing apparatus 300 converts the audio data (e.g., voice data) into text data (hereinafter, first text data) and transmits the first text data to the conference management server 200. Hereinafter, the text data generated from the audio data by using the language processing apparatus 300 is referred to as the first text data.

When the conference management server 200 acquires the first text data from the language processing apparatus 300, the conference management server 200 converts one or more characters included in the screen drawing data into text data (hereinafter, second text data) by referencing the first text data, which is generated by converting the audio data, stored or accumulated as the conference information, by using the language processing apparatus 300. Hereinafter, the text data converted by the conference management server 200 by referencing the first text data is referred to as the second text data.

In the embodiment, characters, drawn on the electronic information board 400 based on the screen drawing data acquired from the electronic information board 400, are converted to the text data (i.e., second text data) by using the conference information stored in the conference management server 200, and the functions of the language processing apparatus 300. For example, when one character is drawn on the electronic information board 400 by handwriting, an image corresponding to the handwritten one character can be displayed on the electronic information board 400 by processing the screen drawing data, but the image displayed on the electronic information board 400 may be difficult to recognize (i.e., legibility is low). As to the embodiment, even if the image, corresponding to the screen drawing data, displayed on the electronic information board 400 is difficult to recognize (i.e., legibility is low), the image corresponding to the handwritten one character can be displayed on the electronic information board 400 by displaying the text data (i.e., second text data) with easy-to-read legibility.

FIG. 1 illustrates one example case of the conference that uses four terminal apparatuses 500, but the number of terminal apparatuses 500 used for the conference is not limited thereto. The number of terminal apparatuses 500 used for the conference can be any numbers. Further, FIG. 1 illustrates one example case of the conference that an entity that holds the conference is one company but the entity is not limited thereto. For example, the entity may be a group of teachers, a group of students or the like. That is, the entity or organization may be any group composed of a plurality of persons, and the conference may be a discussion by a plurality of persons.

Further, the conference management server 200 and the language processing apparatus 300 may not be different apparatuses. For example, the functions of the conference management server 200 and the functions of the language processing apparatus 300 can be implemented by a single information processing apparatus. Further, one or more information processing apparatuses that can provide the conference management service and the language processing services can be devised as one system used by one company. For example, the electronic information board 400, the terminal apparatus 500, and the conference management server 200 of each organization can be configured as one conference management system. Further, each organization can hold a conference using the terminal apparatuses 500 without the electronic information board 400, in which the terminal apparatuses 500 and the conference management server 200 can be configured as one conference management system. Further, the terminal apparatus 500 can be configured to include an audio input device such as a voice sound collector.

Further, the terminal apparatus 500 includes at least a recording device. The terminal apparatus 500 can be a wristwatch type, a glass type or the like. If the terminal apparatus 500 has no function to communicate with the information processing system 100 via a network, a relay apparatus used as a hub is required to acquire audio data recorded by each terminal apparatus 500 used in a conference room, and to transmit the acquired audio data to the information processing system 100. In this case, the terminal apparatus 500 includes an audio input device for recording audio data, and an audio output device for transmitting the audio data to the information processing system 100 via the network. As long as the audio input device and the audio output device are configured to receive and transmit the audio data, the audio input device and the audio output device can be configured by a single device or a plurality of devices.

Further, the information processing system 100 can be configured to include the electronic information board 400.

Figure 2:
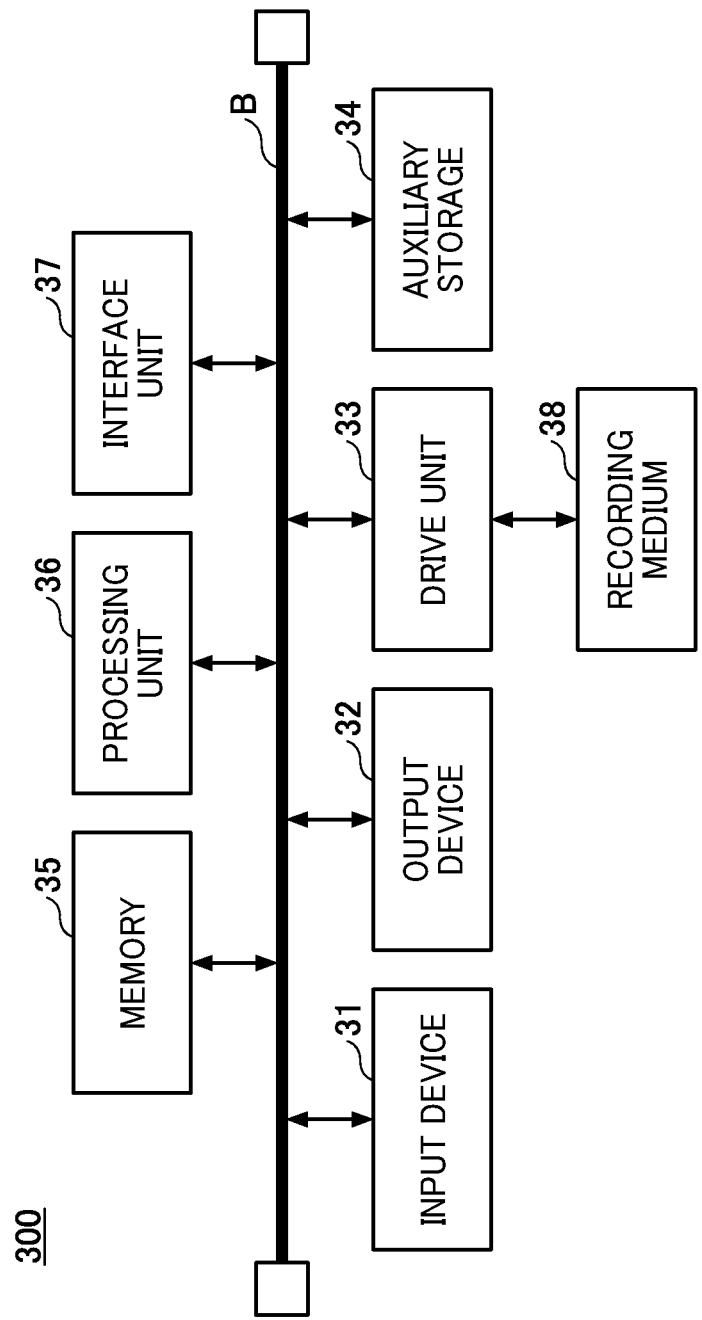
FIG. 2 illustrates an example of a hardware block diagram of a language processing apparatus used in the information processing system of FIG. 1.

Hereinafter, a description is given of apparatuses used in the information processing system 100. FIG. 2 illustrates an example of a hardware block diagram of the language processing apparatus 300 used in the information processing system 100.

The language processing apparatus 300 is a general information processing apparatus, and includes, for example, an input device 31, an output device 32, a drive unit 33, an auxiliary storage 34, a memory 35, a processing unit 36, and an interface unit 37, which are mutually connected via a bus B.

The input device 31 is, for example, a mouse and a keyboard, and is used to input various information. The output device 32 is, for example, a display or the like, and is used to display or output various signals. The interface unit 37 includes, for example, a modem, a local area network (LAN) card or the like, and is used to establish a connection with a network.

The language processing program is a part of various programs used for controlling the language processing apparatus 300. The language processing program can be provided by, for example, distribution of a recording medium 38 or downloading from a network. The recording medium 38 recording the language processing program is, for example, a memory that stores information optically, electrically, or magnetically such as a compact disk read-only memory (CD-ROM), a flexible disk, and a magneto-optical disk, a read-only memory (ROM), a semiconductor memory that electrically stores information such as a flash memory, and various types of recording media.

When the recording medium 38 recording the language processing program is set in the drive unit 33, the language processing program is installed in the auxiliary storage 34 from the recording medium 38 via the drive unit 33. The communication program downloaded from the network is installed in the auxiliary storage 34 via the interface unit 37.

The auxiliary storage 34 stores the installed language processing program, and necessary files, data, and the like. The memory 35 reads out the language processing program stored in the auxiliary storage 34 when the computer is activated, and stores the read-out language processing program. Then, the processing unit 36 performs various processing based on each program stored in the memory 35 to be described later. The processing unit 36 is a computing unit, a processor, or circuitry.

The conference management server 200 is a general computer, and a hardware configuration of the conference management server 200 is same as the language processing apparatus 300, and thereby a description the hardware configuration of the conference management server 200 is omitted.

Figure 3:
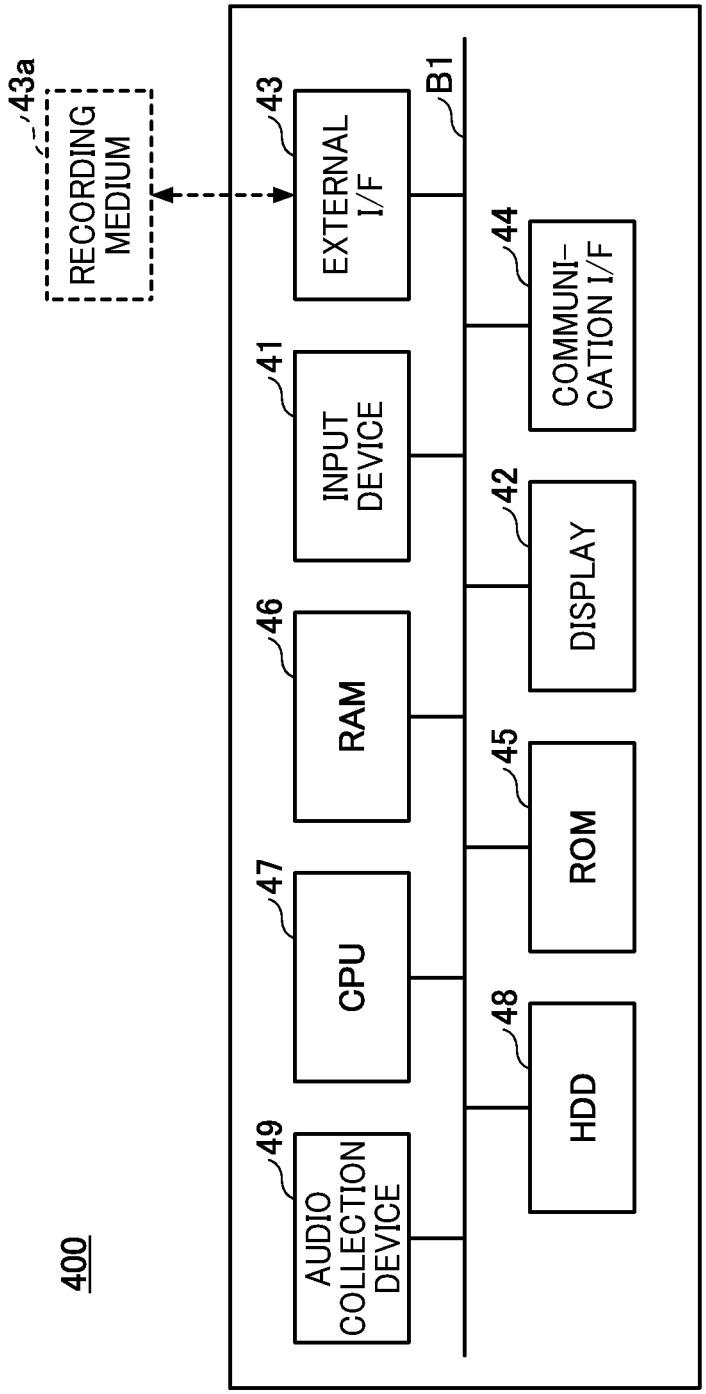
FIG. 3 illustrates an example of a hardware block diagram of an electronic information board used in the information processing system of FIG. 1.

Hereinafter, a description is given of a hardware configuration of the electronic information board 400 with reference to FIG. 3. FIG. 3 illustrates an example of a hardware block diagram of the electronic information board 400.

The electronic information board 400 includes, for example, an input device 41, a display 42, an external interface (I/F) 43, a communication interface (I/F) 44, and a read-only memory (ROM) 45. Further, the electronic information board 400 includes, for example, a random access memory (RAM) 46, a central processing unit (CPU) 47, a hard disk drive (HDD) 48, and an audio collection device 49. Each of these hardware units is connected with each other through a bus B1.

The input device 41 includes, for example, a touch panel, and is used to input various operations selected by a user such as the operation of selecting of functions of voice-text conversion for Japanese, voice-text conversion for English or the like. The display 42 includes, for example, a display or the like, and displays various information such as text indicating a conversion result by the voice-text conversion for Japanese.

The external I/F 43 is an interface used for connecting with an external device. The external device is, for example, a recording medium 43a. With this configuration, the electronic information board 400 can read and write to the recording medium 43a via the external I/F 43. The recording medium 43a includes, for example, a universal serial bus (USB) memory, a compact disk (CD), a digital versatile disc (DVD), a secure digital (SD) memory card or the like.

The communication I/F 44 is an interface used for connecting the electronic information board 400 to a network wirelessly or by wire. With this configuration, the electronic information board 400 can communicate with another device or apparatus via the communication I/F 44.

The HDD is a non-volatile storage device for storing various programs and data. The programs and data stored in the HDD 48 include, for example, an operating system (OS), which is a basic software used for controlling the electronic information board 400, and one or more application programs for providing various functions on the OS.

Further, the HDD 48 manages programs and data stored therein by using a given file system and/or database (DB). Further, instead of the HDD 48, the electronic information board 400 can employ a drive unit such as a solid state drive (SSD) using a flash memory as a recording medium.

The ROM 45 is a non-volatile semiconductor memory that can retain programs and data even when the power supply is turned off. The ROM 45 stores programs and data such as a basic input/output system (BIOS) to be executed when the electronic information board 400 is activated, OS settings, network settings or the like. The RAM 46 is a volatile semiconductor memory that temporarily stores programs and data.

The CPU 47 reads out programs or data from a storage device such as the ROM 45 and/or HDD 48, loads the program or data on the RAM 46, and executes processing to control the electronic information board 400 as a whole, and implement functions of the electronic information board 400, in which the CPU 47 is a processing unit, a computing unit, a processor, or circuitry.

The audio collection device 49 is, for example a microphone, and collects audio such as sound around the electronic information board 400.

The electronic information board 400 having the hardware configuration illustrated in FIG. 3 can perform various processes to be described later.

Figure 4:
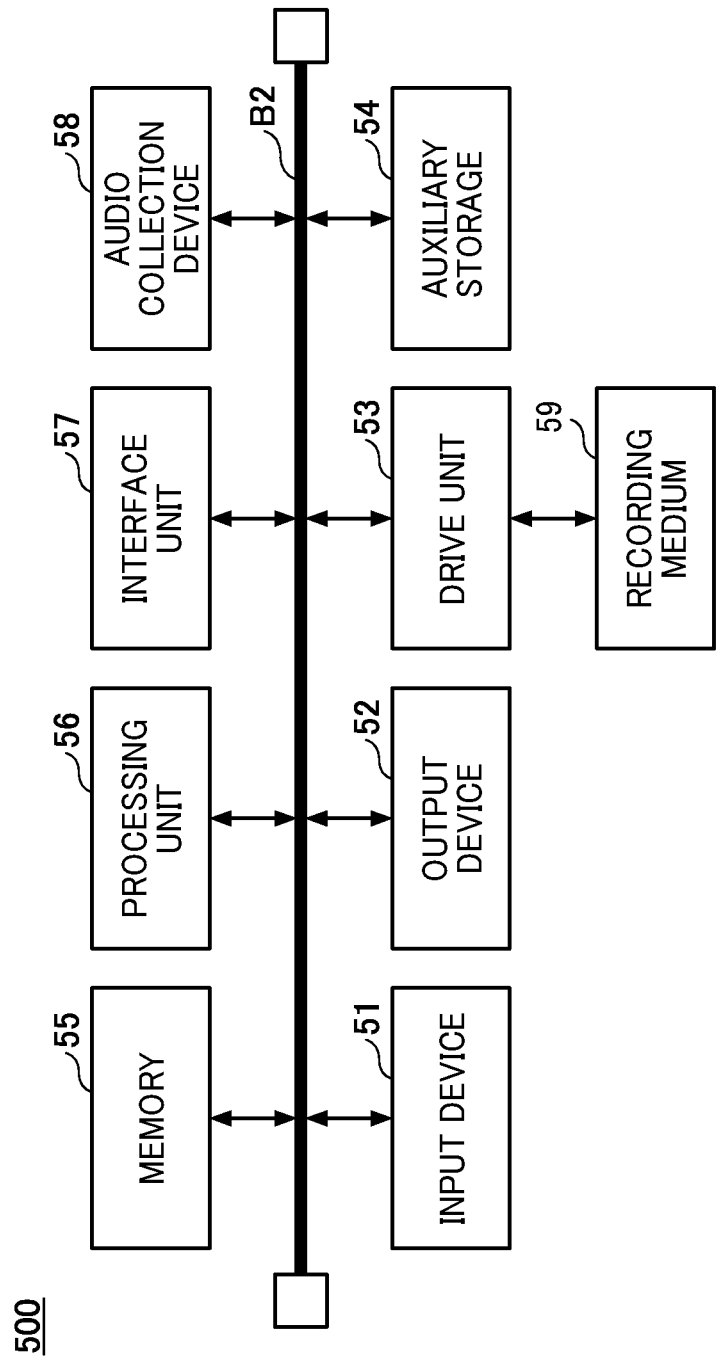
FIG. 4 illustrates an example of a hardware block diagram of a terminal apparatus used in the information processing system of FIG. 1.

Hereinafter, a description is given of a hardware configuration of the terminal apparatus 500 with reference to FIG. 4. FIG. 4 illustrates an example of a hardware block diagram of the terminal apparatus 500.

The terminal apparatus 500 is a general information processing apparatus, and includes, for example, an input device 51, an output device 52, a drive unit 53, an auxiliary storage 54, a memory 55, a processing unit 56, an interface unit 57, and an audio collection device 58, which are connected with each another through a bus B2.

The input device 51 includes, for example, such as a mouse and a keyboard, and is used to input various information. The output device 52 includes, for example, such as a display or the like, and is used to display or output various signals. The interface unit 57 includes, for example, a modem, a local area network (LAN) card or the like, and is used to establish a connection with a network.

The audio collection device 58 is, for example a microphone, and collects audio such as sound around the terminal apparatus 500.

The information processing program is a part of various programs used for controlling the terminal apparatus 500. The information processing program can be provided by, for example, distribution of a recording medium 59 or downloading from a network. The recording medium 59 recording the language processing program is, for example, a memory that stores information optically, electrically, or magnetically such as a compact disk read-only memory (CD-ROM), a flexible disk, and a magneto-optical disk, a read-only memory (ROM), a semiconductor memory that electrically stores information such as a flash memory, and various types of recording media.

When the recording medium 59 recording the information processing program is set in the drive unit 53, the information processing program is installed in the auxiliary storage 54 from the recording medium 59 via the drive unit 53. Further, the communication program downloaded from the network is installed in the auxiliary storage 54 via the interface unit 57.

The auxiliary storage 54 stores the information processing program installed therein and also stores necessary files, data, and the like. The memory 55 reads out the information processing program stored in the auxiliary storage 54 when the computer is activated, and stores the read-out information processing program.

Then, the processing unit 56 performs various processing based on each program stored in the memory 55 to be described later. The processing unit 56 is a computing unit, a processor, or circuitry.

Figure 5:
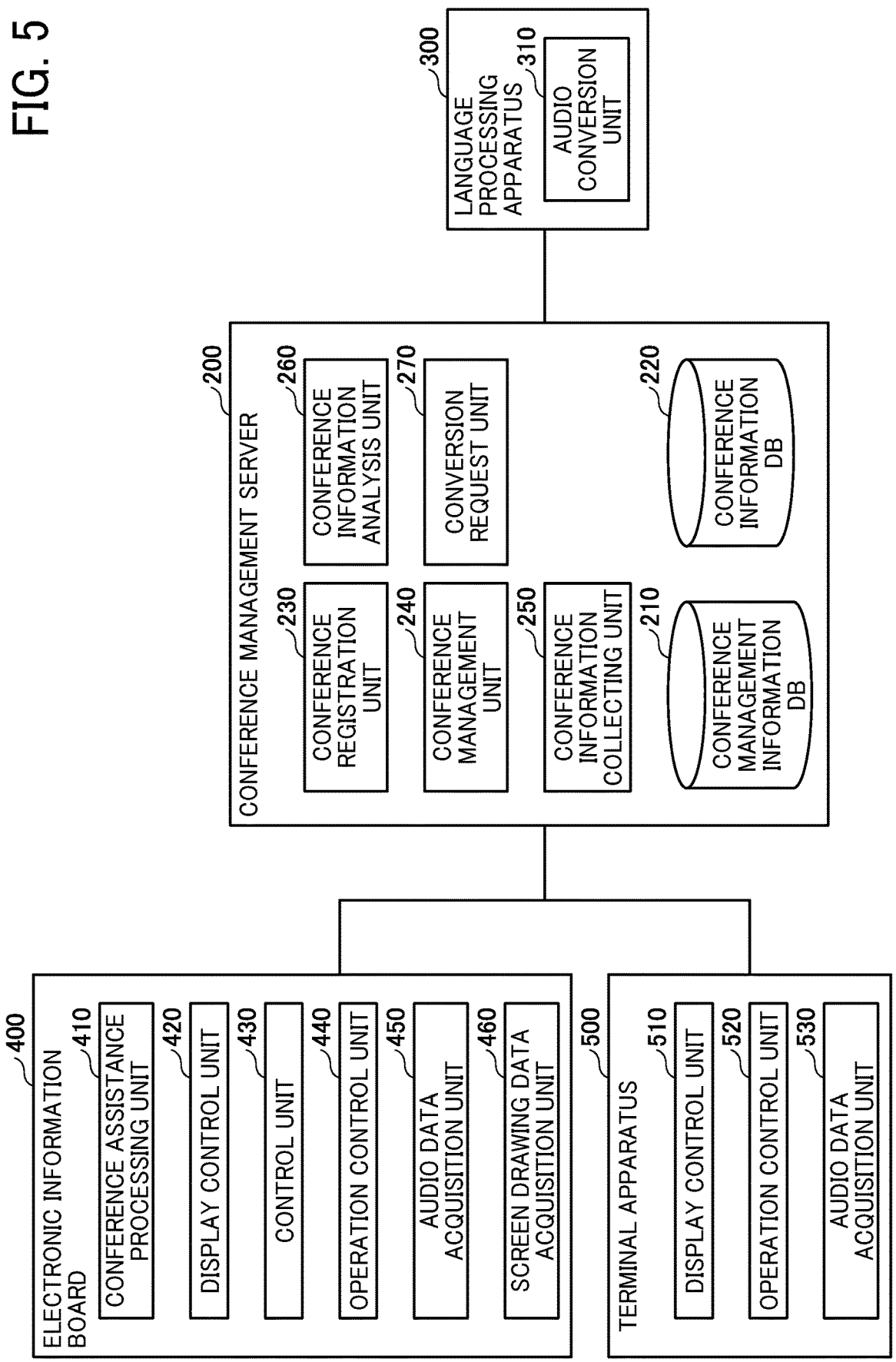
FIG. 5 illustrates an example of functional block diagrams of apparatuses included in the information processing system of the embodiment.

Hereinafter, a description is given of functions of each apparatus included in the information processing system 100 with reference to FIG. 5. FIG. 5 illustrates an example of functional block diagrams of the respective apparatuses included in the information processing system 100 of the embodiment. At first, a description is given of functions of the conference management server 200.

As illustrated in FIG. 5, the conference management server 200 includes, for example, a conference management information database (DB) 210, a conference information database (DB) 220, a conference registration unit 230, a conference management unit 240, a conference information collecting unit 250, a conference information analysis unit 260, and a conversion request unit 270.

The conference management information DB 210 stores conference management information used for managing one or more conferences hosted or held by one or more users. The conference information DB 220 stores conference information of each conference. The details of each database is described later.

When the conference registration unit 230 receives a request for a registration of a new conference from a user, the conference registration unit 230 issues a new conference ID, and registers conference management information for managing the new conference in the conference management information DB 210.

The conference management unit 240 manages one or more to-be-held conferences. Specifically, the conference management unit 240 instructs the conference information collecting unit 250 to start to collect conference information when the conference management unit 240 receives a request for starting a specific conference set with specific conference management information stored in the conference management information database 210. The conference management unit 240 can be also configured to manage one or more conferences held in the past as conference history information.

The conference information collecting unit 250 collects conference information input from one or more apparatuses used in a conference such as the electronic information board 400, the terminal apparatus 500 or the like. The collection of conference information is described in detail later.

The conference information analysis unit 260 converts one or more characters included in an image, drawn by screen drawing data included in the conference information, into the text data (i.e., second text data). The details of the conference information analysis unit 260 is described later.

The conversion request unit 270 requests the language processing apparatus 300 to perform a conversion of audio data (e.g., voice data) included in conference information into text data (i.e., first text data).

For example, the conversion request unit 270 can be configured to receive a conversion instruction of audio data from the conference information analysis unit 260, and then the conversion request unit 270 transmits the request for converting the audio data, stored in the conference information DB 220, to the language processing apparatus 300.

Further, for example, when the conference information collecting unit 250 collects the audio data as the conference information, the conversion request unit 270 can be configured to transmit the acquired audio data and a terminal ID identifying a terminal that has collected the audio data (i.e., terminal is source of audio data) to the language processing apparatus 300 together with the conversion request.

Hereinafter, a description is given of the language processing apparatus 300.

The language processing apparatus 300 includes, for example, an audio conversion unit 310. The language processing apparatus 300 can be configured as, for example, an artificial intelligence implemented by a given computing system. The audio conversion unit 310 refers to each of dictionary databases, and converts or translates audio data (e.g., voice data) to text data (e.g., character). The audio conversion unit 310 is configured to learn a relationship between the input data and the output data each time the audio conversion unit 310 performs the conversion of audio data into text data to enhance the precision of conversion process.

Hereinafter, a description is given of the electronic information board 400 and the terminal apparatus 500. The electronic information board 400 includes, for example, a conference assistance processing unit 410, a display control unit 420, a control unit 430, an operation control unit 440, an audio data acquisition unit 450, a screen drawing data acquisition unit 460.

The conference assistance processing unit 410 performs various processing for supporting or assisting one or more conferences. Specifically, for example, the conference assistance processing unit 410 accesses the conference management server 200, acquires a conference list registered in the conference management information DB 210 from the conference management server 200, and instructs the display control unit 420 to display an input screen used by a user for designating which conference the user is to participate from the acquired conference list displayed on the display 42. Further, when a user manually inputs information to the input device 41 of the electronic information board 400 by performing a handwriting operation on the electronic information board 400, the conference assistance processing unit 410 transmits image data of the input information to the conference management server 200.

The display control unit 420 controls the displaying on the display 42 of the electronic information board 400. The control unit 430 controls the overall operation of the electronic information board 400. The operation control unit 440 receives an operation to one or more operation parts (e.g., operation icons, buttons) of the electronic information board 400. The audio data acquisition unit 450 acquires and retains audio data collected by the audio collection device 49 disposed on the electronic information board 400.

The screen drawing data acquisition unit 460 acquires information, manually input by handwriting on the touch panel of the electronic information board 400, as screen drawing data.

In the embodiment, a profile from a start point of touching of a user's finger or a pointing device on a touch panel (i.e., finger or pointing device is touching on the touch panel) to an end point of touching of the user's finger or a pointing device on the touch panel (i.e., finger or pointing is off from the touch panel) is defined as one stroke. The one stroke can be defined by a plurality of points. The screen drawing data acquisition unit 460 retains coordinate information of a plurality of points defining the one stroke as stroke information for each stroke.

A character or illustration input to the electronic information board 400 by handwriting may be drawn by a plurality of strokes. Therefore, the screen drawing data acquisition unit 460 acquires stroke information for each one of a plurality of strokes configuring the character or illustration as the screen drawing data. Further, in the embodiment, time information indicating one or more time points when the stroke information was acquired is also included in the screen drawing data. The detail of acquisition of screen drawing data is described later.

The terminal apparatus 500 includes, for example, a display control unit 510, an operation control unit 520, and an audio data acquisition unit 530. The display control unit 510 controls displaying on a display of the terminal apparatus 500. The operation control unit 520 performs a process corresponding to an operation performed by the terminal apparatus 500. The audio data acquisition unit 530 acquires audio data collected by the audio collection device 58 of the terminal apparatus 500, and retains the acquired audio data.

Hereinafter, a description is given of databases included in the conference management server 200.

FIG. 6 illustrates an example of the conference management information database (DB) 210.

As illustrated in FIG. 6, the conference management information DB 210 includes information items such as an item section for inputting a conference ID, and an item section for inputting a conference name, and an item section for inputting a terminal ID of an apparatus such as the electronic information board 400 and the terminal apparatus 500 used in a conference identified by the conference ID, in which the information items are associated with each other. Hereinafter, information such as a value of the item "conference ID," a value of the item "conference name," and a value of the item "terminal ID," which are associated with each other in the conference management information DB 210 is collectively referred to as the conference management information.

The value of the item "conference ID" indicates an identifier identifying a conference registered in response to a registration request from a user. The value of the item "conference name" indicates a name of a conference. The values of the item "conference ID" and item the "conference name" can be input before a conference is held by using, for example, the terminal apparatus 500 used by a facilitator of a conference, who is one of the participants of the conference.

The value of the item "terminal ID" indicates the terminal ID of the apparatus such as the terminal apparatus 500 and the electronic information board 400 used by participants that participates the conference identified by the value of the item "conference ID."

When the terminal apparatus 500 accesses the conference management server 200 via the Internet or the like, and a user selects a conference that the user is to participate from a conference list registering to-be-held one or more conferences to instruct a user participation of the selected conference, the terminal ID of the terminal apparatus 500 is registered in the conference management server 200. Further, a user uses the electronic information board 400 to access the conference management server 200 to register the terminal ID of the electronic information board 400 in the conference management server 200.

Specifically, in response to a participation instruction operation by the user, the terminal apparatus 500 transmits a request for participating the conference together with the terminal ID of the terminal apparatus 500 to the conference management server 200. When the conference management server 200 receives the participation request and the terminal ID from the terminal apparatus 500, the conference management server 200 instructs the conference registration unit 230 to register the terminal ID of the terminal apparatus 500 in the conference management information DB 210 by associating the terminal ID of the terminal apparatus 500 with the conference ID of the selected conference.

In an example case of FIG. 6, a conference name of a conference having a conference ID "001" is "market strategy," and users of the terminal apparatuses 500 having the terminal IDs of "01," "02," "03," and "04" participate the conference, and the user of the electronic information board 400 having the terminal ID of "05" also participate the conference. Therefore, in the embodiment, the terminal ID is used as information for specifying or identifying each user that participates the conference using the respective apparatus such as the terminal apparatus 500 and the electronic information board 400.

FIG. 7 illustrates an example of the conference information database (DB) 220. The conference information DB 220 includes information items such as conference ID, terminal ID, collection data such as audio data and screen drawing data, in which the "conference ID" is associated with other information items. In the following description, information including a value of the item "conference ID" and values of other information items are collectively referred to as the conference information, and stored in the conference information DB 220.

The value of the item "audio data" indicates audio data collected by the audio collection device of the apparatus such as the audio collection device 58 of the terminal apparatus 500 and/or the audio collection device 49 of the electronic information board 400 identified by the value of the item "terminal ID." Further, the audio data also includes time information indicating one or more time points when the audio data is collected. The value of item "screen drawing data" indicates image data storing the information drawn on the electronic information board 400. For example, when a user performs a handwriting operation on the electronic information board 400, the operation control unit 440 performs a drawing process on the display 42 of the electronic information board 400 in response to the handwriting operation performed by the user, in which image data storing the information drawn on the electronic information board 400 is transmitted from the electronic information board 400 to the conference management server 200. In the embodiment, the screen drawing data further includes time information indicating one or more time points when the information is drawn on the electronic information board 400.

FIG. 7 illustrates an example case of a conference having the conference ID "002, in which audio data 1 collected by the terminal apparatus 500 having the terminal ID "01,"

audio data 2 collected by the terminal apparatus 500 having the terminal ID "02," the audio data 3 collected by the terminal apparatus 500 having the terminal ID "03," the audio data 4 collected by the terminal apparatus 500 having the terminal ID "04" in the conference having the conference ID "002" are associated with the conference ID "002."

Further, in an example case of FIG. 7, the audio data 5 collected by the electronic information board 400 having the terminal ID "05," and the screen drawing data 1, 2, and 3 acquired by the electronic information board 400 having the terminal ID "05" in the conference having the conference ID "002" are associated with the conference ID "002."

Based on the conference information (see FIG. 7), the conference information can specify speech or comment made by the users of the terminal apparatuses 500 having the terminal IDs "01" to 04," and speech or comment made by the user of the electronic information board 400 having the terminal ID "05," and the information drawn on the electronic information board 400 in the conference having the conference ID "002."

Figure 8:
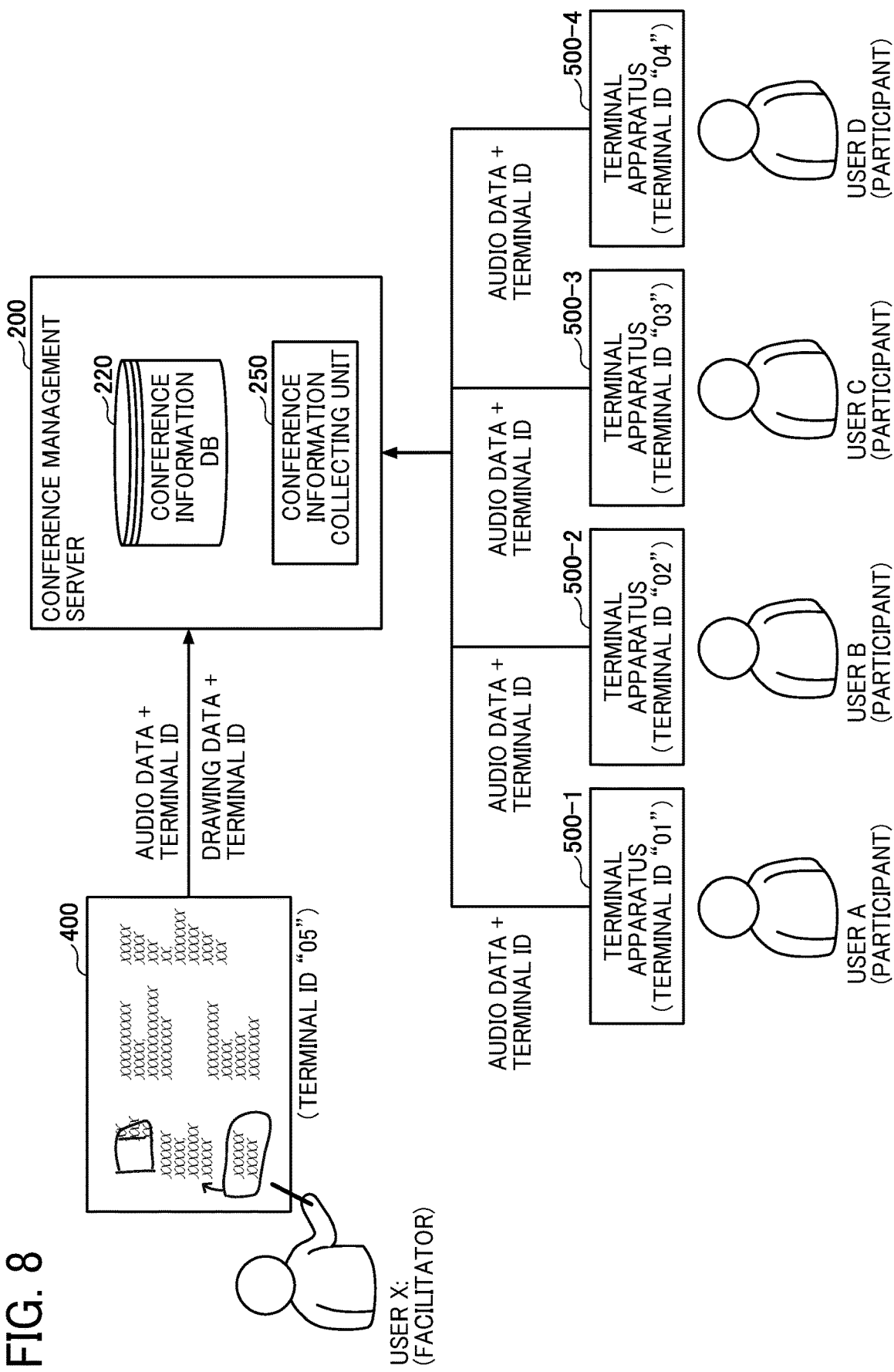
FIG. 8 illustrates a scheme of collecting conference information.

Hereinafter, a description is given of collection of conference information by the conference information collecting unit 250 of the conference management server 200 with reference to FIG. 8. FIG. 8 illustrates a scheme of collecting the conference information.

In an example case of FIG. 8, the users A, B, C, D, and X participate a conference, in which the user A uses a terminal apparatus 500-1 having the terminal ID "01," the user B uses a terminal apparatus 500-2 having the terminal ID "02," the user C uses a terminal apparatus 500-3 having the terminal ID "03," and the user D uses a terminal apparatus 500-4 having the terminal ID "04". Further, in an example case of FIG. 8, the user X is a facilitator of the conference, and the user X uses the electronic information board 400 having the terminal ID "05."

In the embodiment, the terminal ID of the apparatus such as the terminal apparatus 500 and the electronic information board 400 used by each participant can be synonymously regarded as information of the user ID of each user. In this case, each user can input a conference ID of a conference that each user is scheduled to participate, and the terminal ID of the apparatus used by each user before participating the conference.

When the conference ID is input to the terminal apparatus 500 and the electronic information board 400 used by each user, the terminal apparatuses 500 and the electronic information board 400 transmit the input conference ID to the conference management server 200. The conference management server 200 generates the conference management information associating the conference ID and each of the terminal ID of the terminal apparatuses 500 and the electronic information board 400 used by each participant based on the information transmitted from the terminal apparatuses 500 and the electronic information board 400, and stores the conference management information in the conference management information DB 210.

In the embodiment, by performing the above-described procedure, the conference management server 200 is ready to collect conference information including audio data (e.g., voice data) of each user.

In the embodiment, the audio data is transmitted to the conference management server 200 in association with the terminal ID of the terminal apparatus 500 or the electronic information board 400 used by each participant of the conference.

For example, a comment made by the user A who is using the terminal apparatus 500-1 can be collected as audio data (e.g., voice data) by the audio collection device 58 of the terminal apparatus 500-1, and transmitted to the conference management server 200 in association with the terminal ID of the terminal apparatus 500-1.

Further, for example, a comment made by the user C who is using the terminal apparatus 500-3 can be collected as audio data (e.g., voice data) by the audio collection device 58 of the terminal apparatus 500-3, and transmitted to the conference management server 200 in association with the terminal ID of the terminal apparatus 500-3. In other words, the audio data collected by the audio collection device 58 of the terminal apparatus 500-3 is transmitted to the conference management server 200 in association the user identification information of the user C such as the terminal ID of the terminal apparatus 500-3 when the terminal is used as the ID for identifying the user. Further, the user identification information of the user can use the user ID instead of the terminal ID.

Further, in the embodiment, the user X who is the facilitator of the conference is a user of the electronic information board 400. In an example case of FIG. 8, the electronic information board 400 has the terminal ID of "05," and the user of the electronic information board 400 is the user X. Therefore, a comment made by the user X can be collected as audio data (e.g., comment or speech) by the audio collection device 49 of the electronic information board 400, and transmitted to the conference management server 200 in association with the terminal ID "05." In other words, the audio data collected by the audio collection device 49 of the electronic information board 400 is transmitted to the conference management server 200 in association with the user identification information of the user X of the electronic information board 400 such as the terminal ID of the electronic information board 400 when the terminal ID is used as the ID for identifying the user.

Further, as to the electronic information board 400, the character and illustration input to the input device 41 by a handwriting operation of the user X are stored as the screen drawing data, and the screen drawing data is transmitted to the conference management server 200 in association with the terminal ID of the electronic information board 400.

The conference management server 200 assigns the conference ID to the audio data transmitted from the terminal apparatus 500 and the electronic information board 400, the screen drawing data transmitted from the electronic information board 400, and the terminal ID associated with the audio data and the screen drawing data, and stores the conference ID, the audio data, the screen drawing data, and the terminal ID in the conference information DB 220 collectively as the conference information, in which the conference ID, the audio data, the screen drawing data, and the terminal ID are associated with each other. Further, the user ID identifying the user can be also associated with other information.

Figure 9A:
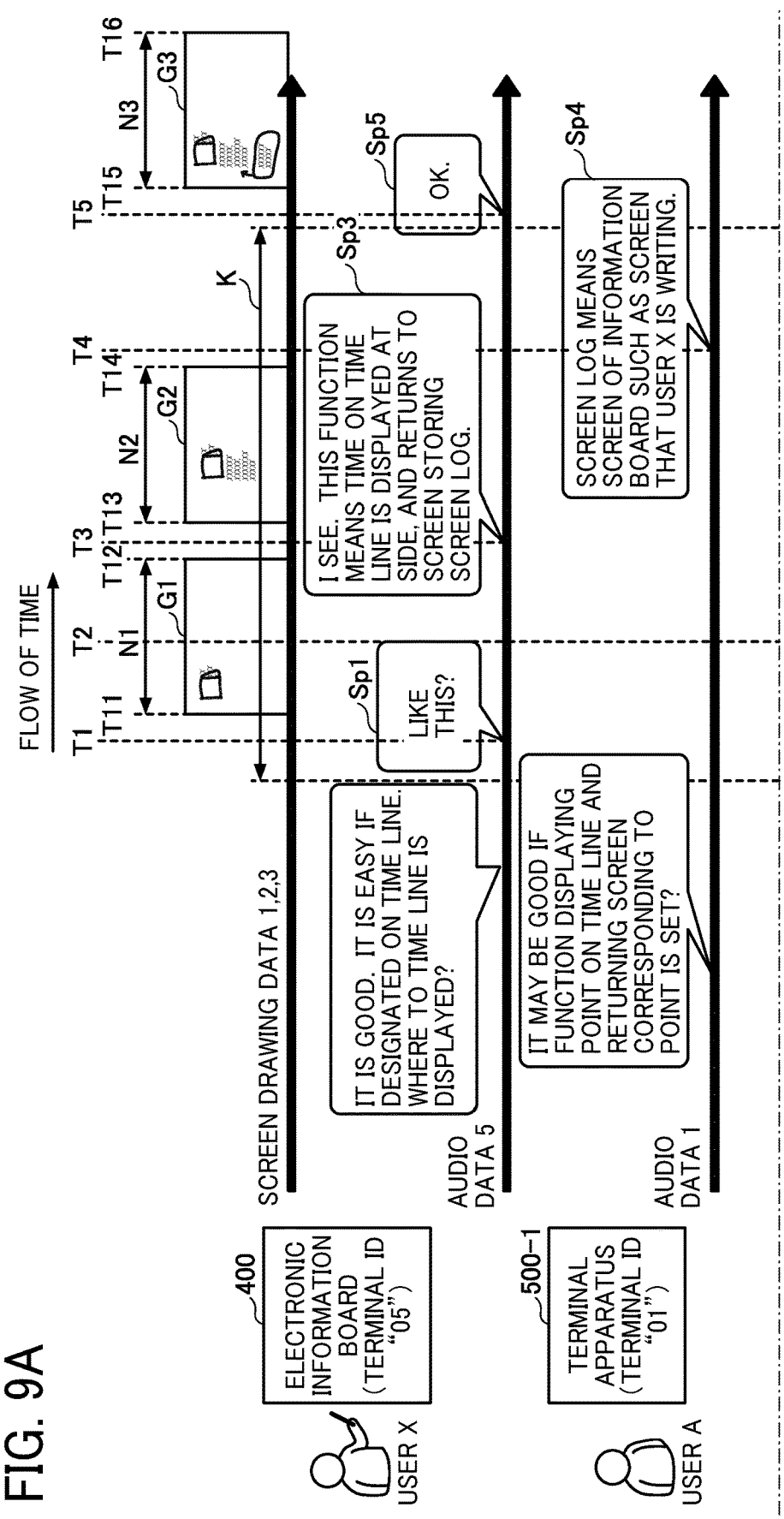

Hereinafter, a description is given of collecting screen drawing data in the embodiment with reference to FIG. 9. FIGS. 9A and 9B illustrate a scheme of collecting the screen drawing data.

In an example case of FIG. 9, it is assumed that screen drawing data 1 corresponding to an image G1, screen drawing data 2 corresponding to an image G2, and screen drawing data 3 corresponding to an image G3 are acquired.

In the embodiment, it is assumed that when a person such as a user inputs a character or a sentence on the touch panel of the electronic information board 400 by performing a handwriting operation, the person draws one stroke and then the next stroke for one character or one sentence with little time interval between the one stroke and the next stroke.

In view of the above-described assumption of the handwriting operation by the person, a time period from one time point when a user's finger or a pointer device leaves the touch panel of the electronic information board 400 to a next time point when the user's finger or the pointer device touches the touch panel of the electronic information board 400 again is counted. When the counted time period between the one time point and the next time point becomes a given time length or longer, the screen drawing data acquisition unit 460 determines that an inputting of stroke by the person is completed.

In other words, when the person is drawing a character on the touch panel of the electronic information board 400, one touch on the touch panel of the electronic information board 400 is started to be detected at a first time point, then the one touch is not detected at a second time point, and then a next touch on the touch panel of the electronic information board 400 is detected at a third time point, in which a time period from the second time point (i.e., one touch is not detected) to the third time point (i.e., next touch is detected) is counted. When the counted time period becomes the given time length or longer, the screen drawing data acquisition unit 460 determines that an inputting of the character by the person is completed.

In this configuration, a plurality of strokes is input for drawing one or more characters, in which it is determined that the input of strokes for drawing one or more characters is completed when the detection of one touch on the touch panel is ended, and then the detection of a next touch on the touch panel is started again after the above described given time length or longer is counted. The screen drawing data acquisition unit 460 acquires a stroke, input at first, and one or more subsequently input strokes, input within the above described given time length between the adjacent input strokes, as the stroke information, which is also referred to as the screen drawing data in this description.

FIG. 9 illustrates one example case of collecting the screen drawing data when the screen drawing data is generated by a plurality of touching operations on the touch panel of the electronic information board 400, in which a time interval occurs between adjacent touching operations. In an example case of FIG. 9, a touch on the touch panel of the electronic information board 400 is being detected from a time point T11 (i.e., start time point), and then a detection time interval between adjacent touches from the time point T11 to a time point T12 is less than the given time length. Then, a detection time interval between the end of detection of one touching operation at the time point T12 and the start of a next touching operation on the touch panel at a time point T13 becomes the given time length or longer.

In this case, it is determined that the user X of the electronic information board 400 inputs information by performing a handwriting operation during a period N1, which is from the time point T11 to the time point T12, in which the input information is considered as one group or chunk by the user X.

Then, the screen drawing data acquisition unit 460 associates the stroke information input during the period N1, and information of the time point T11 corresponding the time point when the input of information is started as the screen drawing data 1, and transmits the screen drawing data 1 to the conference management server 200.

Then, a touch on the touch panel is detected again on the electronic information board 400 at the time point T13, and then a detection time interval between adjacent touches from the time point T13 to a time point T14 is less than the given time length. Then, a detection time interval between the end of detection of one touching operation at the time point T13 and the start of a next touching operation on the touch panel at a time point T15 becomes the given time length or longer.

Therefore, the screen drawing data acquisition unit 460 acquires stroke information input during a period N2, which is from the time point T13 to the time point T14. Then, the screen drawing data acquisition unit 460 associates the stroke information acquired as the screen drawing data 1 and the stroke information acquired during the period N2 with information of the time point T13 as the screen drawing data 2, and transmits the screen drawing data 2 to the conference management server 200.

As described above, in the embodiment, the stroke information acquired as the screen drawing data 1, which is the most-recently acquired stroke information before acquiring the latest stroke information, and the latest acquired stroke information are collectively stored as the screen drawing data 2. Therefore, when the screen drawing data 2 is displayed on the electronic information board 400, the image, drawn on the touch panel at the time point T14, can be drawn on the touch panel of the electronic information board 400 as the image G2 by including the image G1 as illustrated in FIG. 9.

Then, a touch on the touch panel is detected again on the electronic information board 400 at the time point T15, and then a detection time interval between adjacent touches from the time point T15 to a time point T16 is less than the given time length. Then, a detection time interval between the end of detection of one touching operation at the time point T16 and the start of a next touching operation on the touch panel at another time point becomes the given time length or longer.

Then, the screen drawing data acquisition unit 460 acquires the stroke information input during a period N3, which is from the time point T15 to the time point T16, the stroke information acquired as the screen drawing data 2, and information of the time point T15 as screen drawing data 3, and transmits the screen drawing data 3 to the conference management server 200.

Therefore, in the embodiment, when the screen drawing data 3 is displayed on the electronic information board 400, the image, drawn on the touch panel at the time point T16, can be drawn on the touch panel of the electronic information board 400 as the image G3 including the image G1 and G2 as illustrated in FIG. 9.

Figure 10:
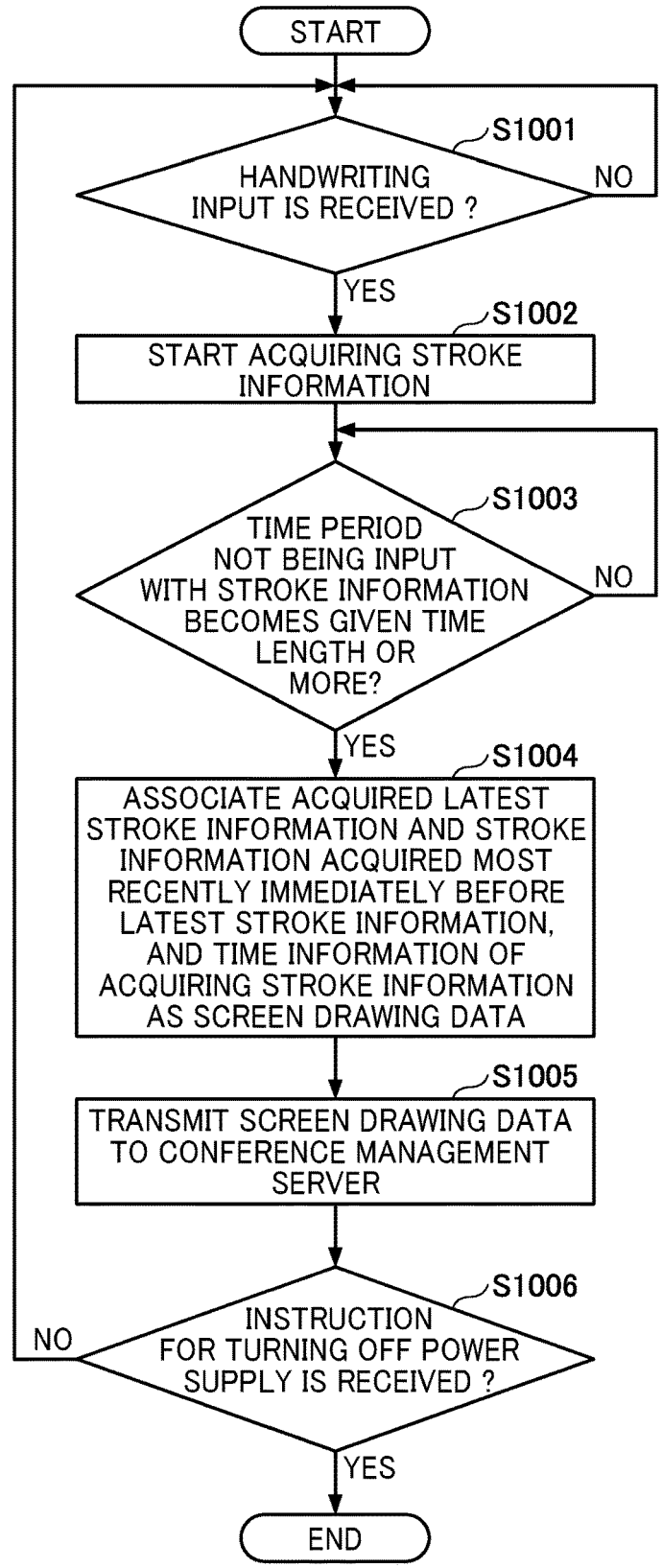
FIG. 10 is an example of a flowchart illustrating the steps of processing by a screen drawing data acquisition unit.

Hereinafter, a description is given of processing by the screen drawing data acquisition unit 460 with reference to FIG. 10. FIG. 10 is an example of a flowchart illustrating the steps of processing by the screen drawing data acquisition unit 460.

The screen drawing data acquisition unit 460 determines whether a handwriting input is received by the electronic information board 400 (step S1001). In other words, the screen drawing data acquisition unit 460 determines whether a contact or touch on the touch panel of the electronic information board 400 is detected by the electronic information board 400.

When the handwriting input is not received by the electronic information board 400 (step S1001: NO), the screen drawing data acquisition unit 460 waits to receive the handwriting input.

When the handwritten input is received by the electronic information board 400 (step S1001: YES), the screen drawing data acquisition unit 460 starts to acquire the stroke information (step S1002).

Then, the screen drawing data acquisition unit 460 determines whether a time period not being input with the stroke information becomes the given time length or longer (step S1003). In other words, the screen drawing data acquisition unit 460 determines whether the given time length or longer is counted after the end of the detection of the most-recent touch on the touch panel.

At step S1003, if the time period not being input with the stroke information is less than the given time length (step S1003: NO), the screen drawing data acquisition unit 460 continues to acquire the stroke information.

By contrast, at step S1003, if the time period not being input with the stroke information becomes the given time length or longer (step S1003: YES), the screen drawing data acquisition unit 460 associates the currently (or latest) acquired stroke information, the most-recent acquired stroke information (i.e., stroke information acquired immediately before the currently acquired stroke information), and information of a start time of acquiring the stroke information at step S1002 collectively as latest screen drawing data (step S1004).

Then, the screen drawing data acquisition unit 460 transmits the screen drawing data, acquired at step S1004, to the conference management server 200 (step S1005), in which the screen drawing data acquisition unit 460 transmits the screen drawing data to the conference management server 200 together with the conference ID and the terminal ID.

Then, the screen drawing data acquisition unit 460 determines whether an instruction for turning off the power supply of the electronic information board 400 is received by the electronic information board 400 (step S1006). At step S1006, when the power-off instruction is not yet received by the electronic information board 400 (step S1006: NO), the screen drawing data acquisition unit 460 returns the sequence to step S1001.

By contrast, at step S1006, when the power-off instruction is received by the electronic information board 400 (step S1006: YES), the screen drawing data acquisition unit 460 ends the sequence of FIG. 10.

Figure 11:
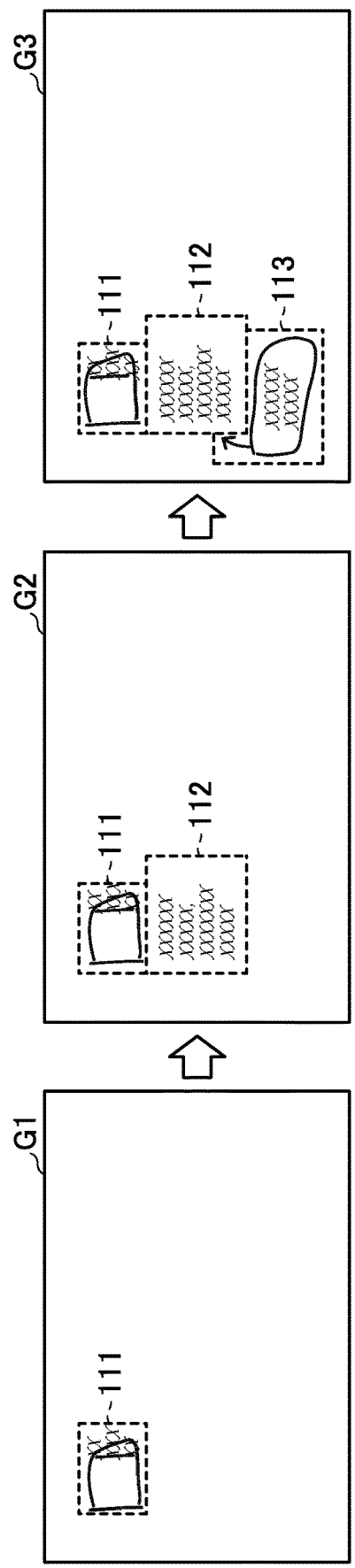
FIG. 11 illustrates an example of images drawn by screen drawing data.

FIG. 11 illustrates an example of images drawn by the screen drawing data. In FIG. 11, the image G1 is drawn by the screen drawing data 1, the image G2 is drawn by the screen drawing data 2, and the image G3 is drawn by the screen drawing data 3.

In the image G1, an image 111 indicating the stroke information acquired during the period N1 is displayed. In the image G2, an image 112 indicating the stroke information acquired during the period N2 is displayed together with the image 111. In the image G3, an image 113 indicating the stroke information acquired during the period N3 is displayed together with the images 111 and 112.

As above described, in the embodiment, each time one chunk of information is written on the electronic information board 400, the one chunk of information can be stored as the screen drawing data. Therefore, in the embodiment, unclear information not having importance, such as an incomplete stroke drawn in the middle of writing one or more sentences or characters, may not be stored.

Further, the given time length can be set any values depending on, for example, a speed of writing operation of each user participating in the conference.

In the embodiment, the screen drawing data is acquired for each conference identified by the corresponding conference ID as described above.

Hereinafter, a description is given of the conference information analysis unit 260 with reference to FIG. 12.

Figure 12:
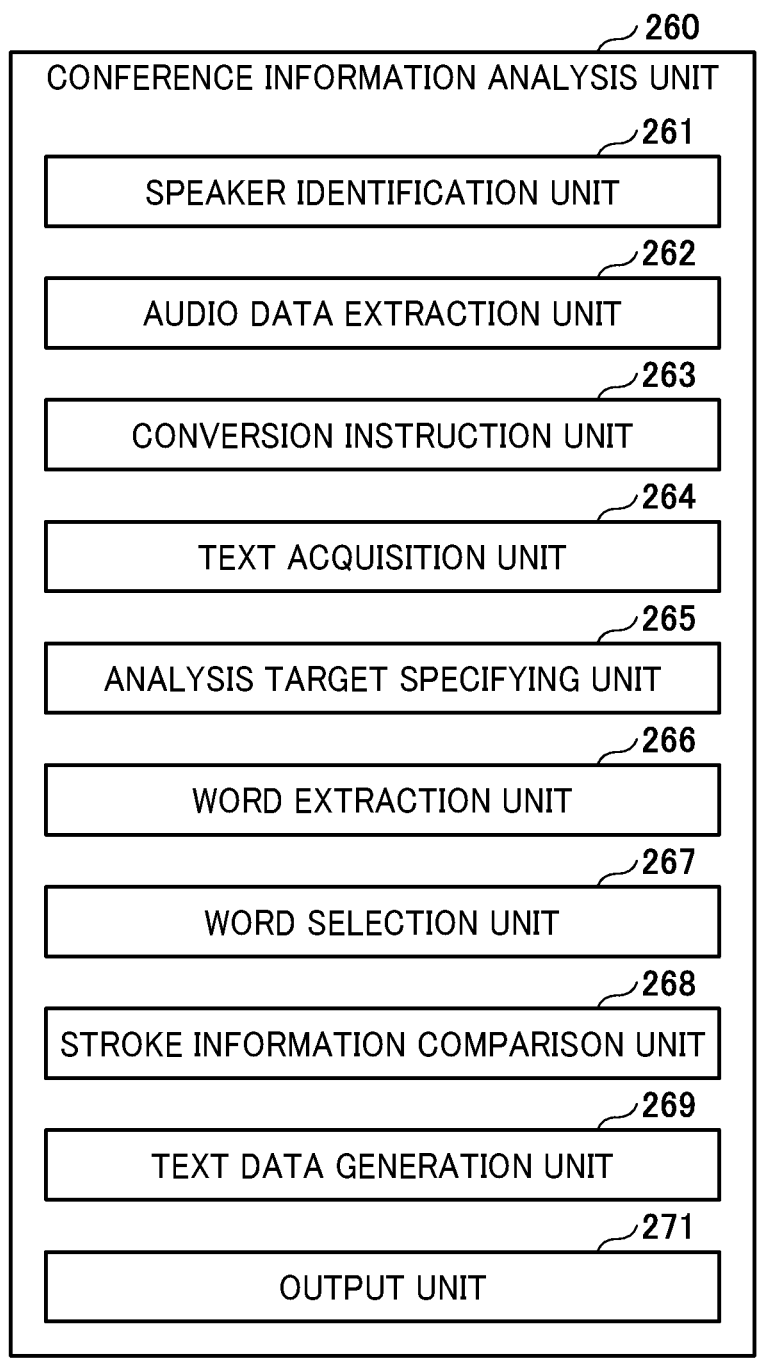
FIG. 12 illustrates an example of a functional block diagram of a conference information analysis unit.

FIG. 12 illustrates an example of a functional block diagram of the conference information analysis unit 260.

As illustrated in HG. 12, the conference information analysis unit 260 includes, for example, a speaker identification unit 261, an audio data extraction unit 262, a conversion instruction unit 263, a text acquisition unit 264, an analysis target specifying unit 265, a word extraction unit 266, a word selection unit 267, a stroke information comparison unit 268, a text data generation unit 269, and an output unit 271.

The conference information analysis unit 260 converts one or more characters, included in the screen drawing data included in the conference information, into the second text data based on each audio data collected at each time point before the screen drawing data is acquired, during the screen drawing data is acquired, or after the screen drawing data is acquired.

In a conference, the user X, who is the facilitator, is assumed to write contents of each participant's speech, an agenda, and an essence of discussion on the electronic information board 400 to share information with the participants of the conference. Therefore, one or more sentences and/or characters manually written on the electronic information board 400 by the user X can be assumed close to the contents of each speech made by each participant before starting the writing on the electronic information board 400, during the writing on the electronic information board 400, and after the writing on the electronic information board 400.

In the embodiment, based on the above described assumption of writing timing with respect to the speech, each audio data collected before starting the writing on the electronic information board 400, during the writing on the electronic information board 400, and after the writing on the electronic information board 400 is converted into the first text data, and then one or more characters indicated by the stroke information are converted into the second text data by comparing the first text data and the stroke information included in the screen drawing data.

The speaker identification unit 261 identifies each speaker speaking before starting the writing on the electronic information board 400, during the writing on the electronic information board 400, and after the writing on the electronic information board 400 (i.e., before the screen drawing data is acquired, during the screen drawing data is acquired, and after the screen drawing data is acquired) based on the audio data included in the conference information acquired during a specific conference identified by a specific conference ID.

When the speaker identification unit 261 identifies each speaker speaking before the screen drawing data is acquired, during the screen drawing data is acquired, or after the screen drawing data is acquired based on the conference information acquired during the specific conference identified by the specific conference ID, the audio data extraction unit 262 extracts the audio data of each speaker identified by the speaker identification unit 261 as the speaker that made the speech before the screen drawing data is acquired, during the screen drawing data is acquired, or after the screen drawing data is acquired.

The conversion instruction unit 263 transfers the audio data extracted by the audio data extraction unit 262 to the conversion request unit 270 together with an instruction for converting the audio data into the first text data. The conversion request unit 270 transmits the audio data and the conversion request to the language processing apparatus 300, and receives the first text data from the language processing apparatus 300.

The text acquisition unit 264 acquires the first text data received by the conversion request unit 270.

The analysis target specifying unit 265 specifies an analysis target text data from the first text data acquired by the text acquisition unit 264 as analysis-target text data. The detail of specifying the analysis-target text data is described later.

The word extraction unit 266 extracts one or more words from the analysis-target text data specified by the analysis target specifying unit 265. The word extraction unit 266 performs, for example, a morphological analysis on the analysis-target text data, in which the analysis-target text data is divided into a row of a plurality of morphemes, and each of the morphemes may be extracted as a word. A morpheme means the minimum unit or the smallest unit having meaning in one language such as English.

The word selection unit 267 selects a word, which is to be compared with the stroke information, from the one or more words extracted by the word extraction unit 266.

Specifically, the stroke information comparison unit 268 compares a shape of one or more characters included in the word selected by the word selection unit 267, and a shape indicated by the stroke information included in the screen drawing data to determine whether one or more handwritten-input characters and one or more characters extracted from the analysis-target text data are the same.

When the stroke information comparison unit 268 determines that the one or more handwritten-input characters match the one or more characters extracted from the analysis-target text data based on the above comparison processing, the text data generation unit 269 generates the second text data including one or more words configured by the one or more characters that the stroke information comparison unit 268 determines that the shape of the one or more characters included in the word selected by the word selection unit 267 match the shape indicated by the stroke information included in the screen drawing data.

The output unit 271 outputs the second text data generated by the text data generation unit 269 to the electronic information board 400.

Hereinafter, a description is given of processing by the conference information analysis unit 260 with reference to FIGS. 13 and 14.

Figure 13:
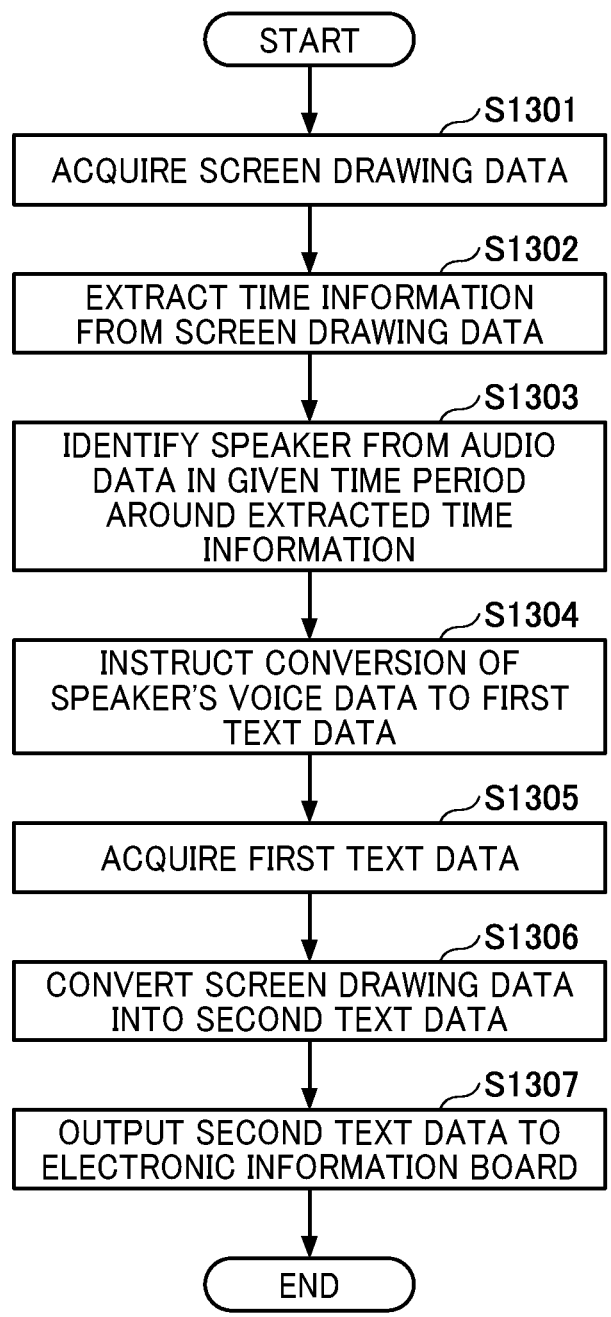
FIG. 13 is a first flowchart illustrating the steps of processing by the conference information analysis unit.
Figure 14:
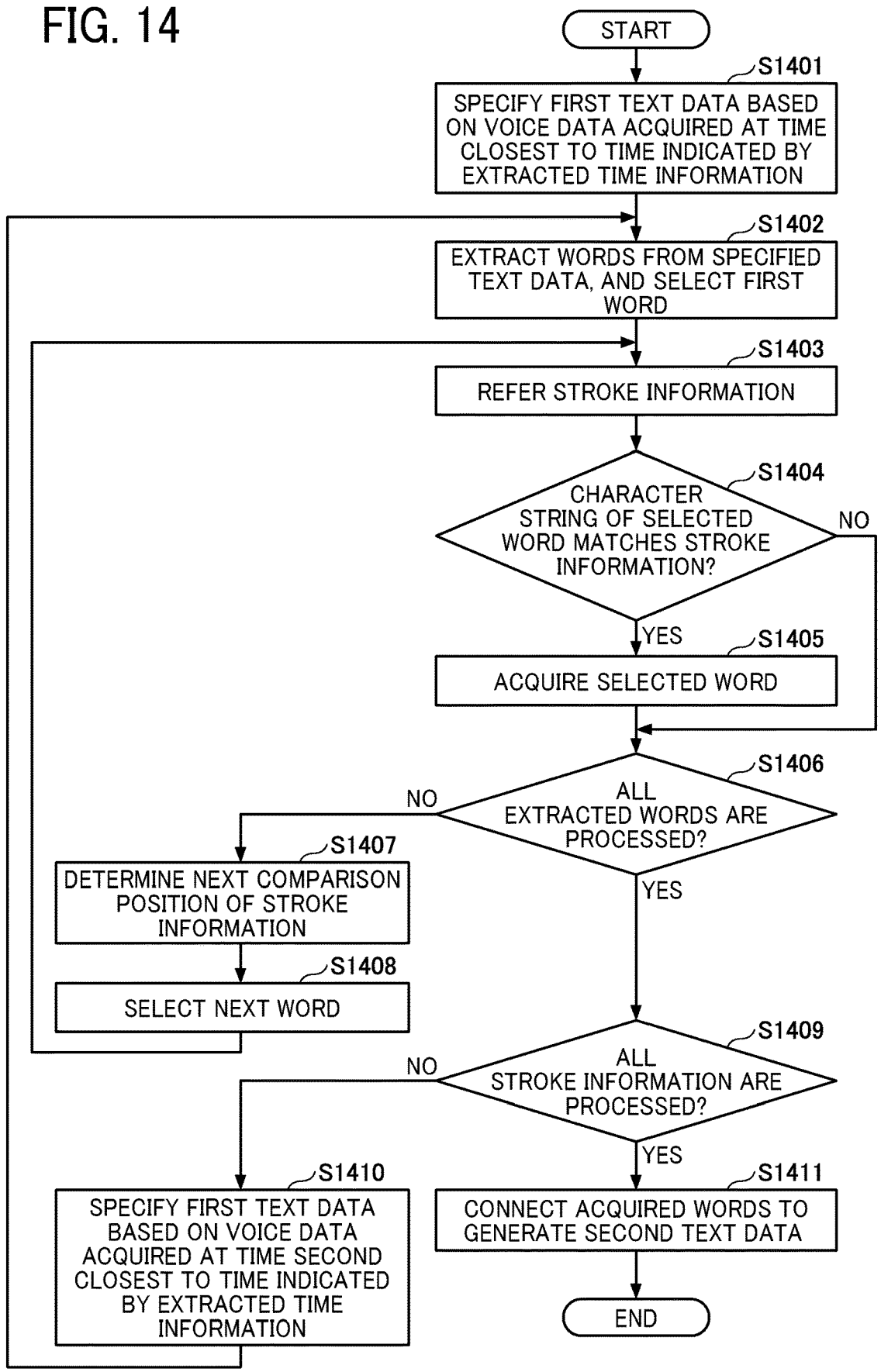
FIG. 14 is a second flowchart illustrating processing by the conference information analysis unit.

FIG. 13 is a first flowchart illustrating the steps of processing by the conference information analysis unit 260.

When the conference information analysis unit 260 receives an instruction for converting the screen drawing data to the text data (i.e., second text data), the conference information analysis unit 260 acquires the screen drawing data from the conference information DB 220 (step S1301).

In this configuration, the conference information analysis unit 260 can be configured to receive the conversion instruction, for example, when the conference information collecting unit 250 stores the screen drawing data, the conference ID, and the terminal ID in the conference information DB 220. Further, the conference information analysis unit 260 can be configured to receive the conversion instruction, for example, when the conference ID is specified, in which the conference information analysis unit 260 can be configured to acquire the screen drawing data, associated with the specified conference ID, from the conference information stored in the conference information DB 220.

Then, in the conference information analysis unit 260, the speaker identification unit 261 extracts time information indicating one or more time points from the screen drawing data (step S1302).

Then, in the conference information analysis unit 260, the speaker identification unit 261 acquires audio data acquired within a given data-acquiring period including a period before the screen drawing data is acquired, a period during the screen drawing data is acquired, and a period after the screen drawing data is acquired, from the audio data included in the conference information, and identifies each speaker within the given data-acquiring period (step S1303), in which the given data-acquiring period can be set by setting a time point of acquiring the screen drawing data, extracted from the screen drawing data, as the center of the given data-acquiring period. The detail of processing of the speaker identification unit 261 is described later. In the embodiment, the given data-acquiring period is set by setting the time point extracted from the screen drawing data as the center of the given data-acquiring period, but the time point extracted from the screen drawing data is not required to be the center of the given data-acquiring period. For example, the given data-acquiring period can be set by including the time point extracted from the screen drawing data at any timing within the given data-acquiring period.

Then, in the conference information analysis unit 260, the audio data extraction unit 262 extracts audio data (e.g., voice data) of the speaker specified within the given data-acquiring period from the audio data related to the specified speaker, and then transfers the extracted audio data, and a conversion instruction of the extracted audio data into the first text data to the conversion request unit 270 via the conversion instruction unit 263 (step S1304). The conversion request unit 270 transmits the extracted audio data, and the conversion instruction of the extracted audio data to the language processing apparatus 300.

Then, in the conference information analysis unit 260, the text acquisition unit 264 acquires the first text data, which is received from the language processing apparatus 300 via the conversion request unit 270 (step S1305).

Then, in the conference information analysis unit 260, the stroke information comparison unit 268 compares the first text data and the stroke information to convert one or more characters included in the screen drawing data into the second text data (step S1306). The details of processing at step S1306 is described later.

Then, in the conference information analysis unit 260, the output unit 271 outputs the second text data to the electronic information board 400 (step S1307).

Hereinafter, a description is given of processing at step S1306 of FIG. 13 with reference to FIG. 14. FIG. 14 is a second flowchart illustrating the steps of processing by the conference information analysis unit 260.

When the conference information analysis unit 260 acquires the first text data (step S1305), the analysis target specifying unit 265 specifies the first text data, corresponding to the audio data acquired at a time point that is the closest to a time point indicated by the time information extracted from the screen drawing data at step S1302, as the analysis-target text data (step S1401). In the embodiment, the audio data can be acquired at different time points, and one of the audio data is acquired at the time point that is the closest to the time point indicated by the time information extracted from the screen drawing data, among the different time points.

Then, in the conference information analysis unit 260, the word extraction unit 266 performs the morphological analysis to the specified analysis-target text data to extract one or more morphemes as one or more words, and then the word selection unit 267 selects a first word among the one or more words extracted by the word extraction unit 266 (step S1402).

Then, in the conference information analysis unit 260, the stroke information comparison unit 268 refers to the stroke information included in the screen drawing data acquired at step S1301 (step S1403). Then, the stroke information comparison unit 268 compares the stroke information and the word selected at step S1402 to determine whether a string of characters configuring the selected word matches a portion or part of the stroke information (step S1404).

Specifically, the stroke information comparison unit 268 can be configured to convert the stroke information to text data configured with a string of characters by applying a known handwritten character recognition technique, to compare the text data configured with the string of characters and the selected word, and to determine whether the text data matches the selected word. Further, the stroke information comparison unit 268 can be configured to compare a shape of stoke drawn by the stroke information and a string of characters configuring the extracted word based on a value of similarity level, in which the stroke information comparison unit 268 determines that the shape of stoke drawn by the stroke information matches the string of characters configuring the extracted word when the similarity level becomes a given value or more.

When the stroke information comparison unit 268 determines that the string of characters configuring the selected word does not match the portion or part of the stroke information (step S1404: NO), the conference information analysis unit 260 proceeds the sequence to step S1406.

By contrast, when the stroke information comparison unit 268 determines that the string of characters configuring the selected word matches the portion or part of the stroke information (step S1404: YES), the text data generation unit 269 acquires and retains the selected word in the conference information analysis unit 260 (step S1405).

Then, the conference information analysis unit 260 determines whether the processing from steps S1403 to S1405 is performed for all of the extracted words (step S1406).

At step S1406, if the processing from steps S1403 to S1405 is not completed for all of the extracted words (step S1406: NO), in the conference information analysis unit 260, the stroke information comparison unit 268 determines a next comparing position in the stroke information (step S1407).

Specifically, when the stroke information comparison unit 268 determines that the stroke information matches the selected word based on a comparison result at step S1404, the stroke information comparison unit 268 determines a next stroke adjacent to the compared stroke among the strokes indicated by the stroke information as a next comparing position. Further, when the stroke information comparison unit 268 determines that the stroke information does not match the selected word based on the comparison result at step S1404, the stroke information comparison unit 268 determines the most-recently compared stroke as a next comparing position to compare the most-recently compared stroke with another word again.

Then, in the conference information analysis unit 260, the word selection unit 267 selects the next word from the one or more words extracted by the word extraction unit 266 (step S1408), and then the sequence returns to step S1403.

At step S1406, when the processing is completed for all of the extracted words (step S1406: YES), the text data generation unit 269 determines whether the comparing process is performed for all of the stroke information included in the screen drawing data (step S1409).

If the comparing process is not yet performed for all of the stroke information included in the screen drawing data (step S1409: NO), in the conference information analysis unit 260, the analysis target specifying unit 265 specifies another first text data corresponding audio data collected at another time point that is the second closest to the time point indicated by the time information extracted from the screen drawing data (step S1410), then the sequence returns to step S1402. The another time point, which is the second closest to the time point indicated by the time information extracted from the screen drawing data, is closer to the time point indicated by the time information extracted from the screen drawing data compared to other time points except the time point that is the closest to the time point indicated by the time information extracted from the screen drawing data.

By contrast, if the comparing process is already performed for all of the stroke information (step S1409: YES), in the conference information analysis unit 260, the text data generation unit 269 connects the retained words to generate the second text data (step S1411), and then the sequence ends.

Hereinafter, a description is given of processing of the conference information analysis unit 260 with reference to FIGS. 15 to 17. A description is given of processing of the speaker identification unit 261 of the conference information analysis unit 260 with reference to FIG. 15.

Figure 15:
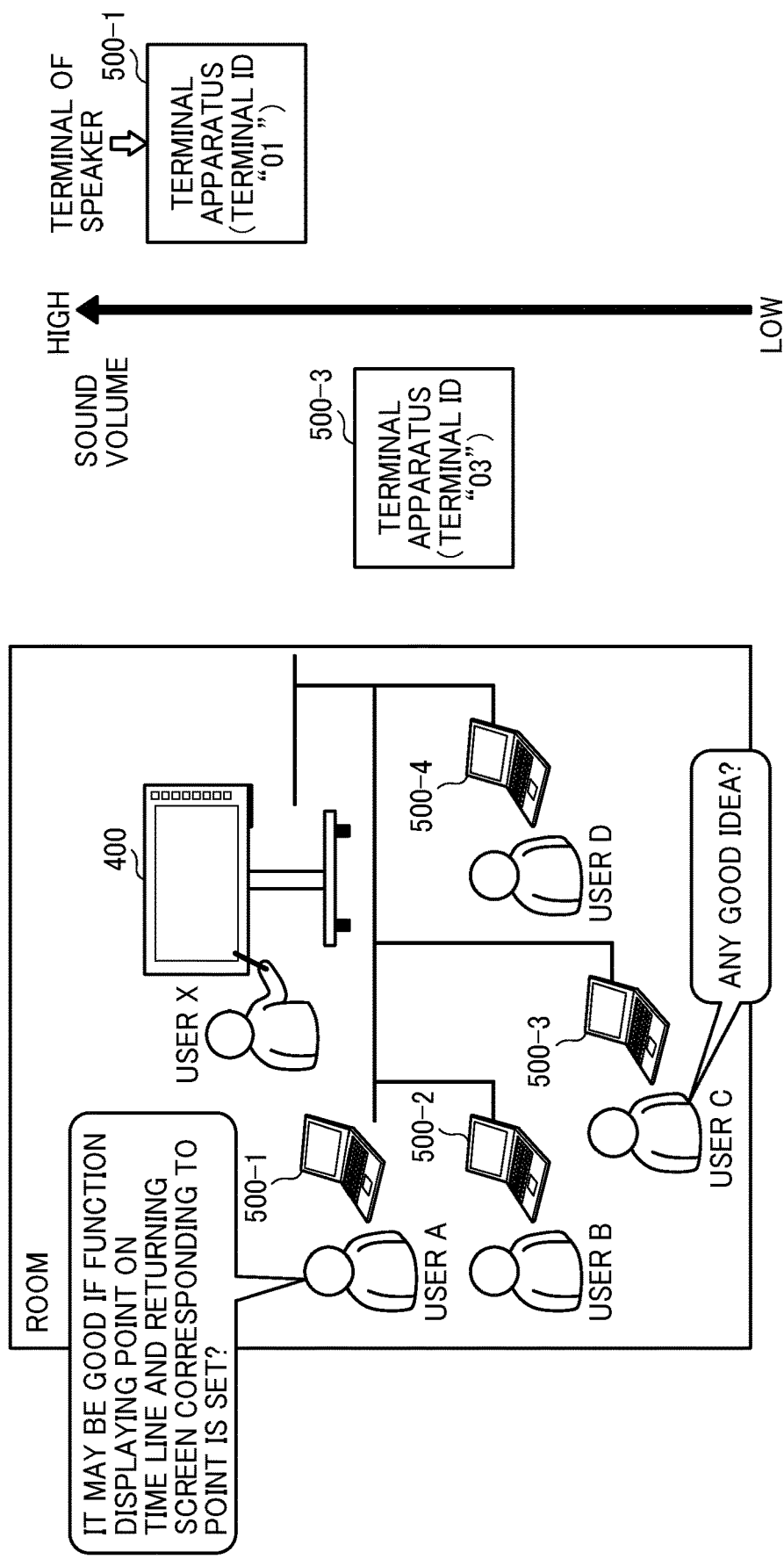
FIG. 15 illustrates a scheme of processing by a speaker identification unit.

FIG. 15 illustrates a scheme of processing by the speaker identification unit 261.

In the embodiment, the speaker identification unit 261 specifies a user of the terminal apparatus 500 that collects audio data having the highest sound volume at a specific time point indicated by specific time information included in the screen drawing data as a speaker at the specific time point.

In a conference room, audio data such as voice data is collected by a plurality of terminals used in the conference room, in which the same user's speech may be recorded by the plurality of terminal apparatuses. In this case, it can be assumed that a person (user A), speaking some suggestions in the conference room, speaks to all of the participants, and thereby a sound volume of speech of the user A becomes greater than a sound volume of a person talking to only a neighboring person such as the user C whispers to the user D next to the user C. Therefore, at a certain point in a time line, it can be determined that one voice data having the highest sound volume among voice data collected by the terminal apparatuses is the person (user A) that presents a speech. Then, the voice data of the person (user A) speaking with the highest sound volume is extracted as the voice data of the speaker at the certain point in the time line. In an example case of FIG. 15, it is assumed that one audio data is collected from the terminal apparatus 500-1, and another audio data is collected from the terminal apparatus 500-3 at a specific time point. In this example case, the sound volume of the audio data collected by the terminal apparatus 500-1 is greater than the sound volume of the audio data collected by the terminal apparatus 500-3 as illustrated in FIG. 15.

Therefore, the speaker identification unit 261 identifies the user of the terminal apparatus 500-1 that has collected the audio data having the highest sound volume at the specific time point as the speaker at the specific time point.

Further, in the embodiment, when the audio data of a plurality of users are collected by one terminal apparatus 500 at a specific time point, it can be determined that audio data having the highest sound volume among the collected audio data is the audio data of the user of the one terminal apparatus 500 at the specific time point.

Hereinafter, a description is given of a process of comparing stroke information and a word by the conference information analysis unit 260 with reference to FIG. 16. FIG. 16 illustrates a scheme of comparing the stroke information and the word.

Figure 16:
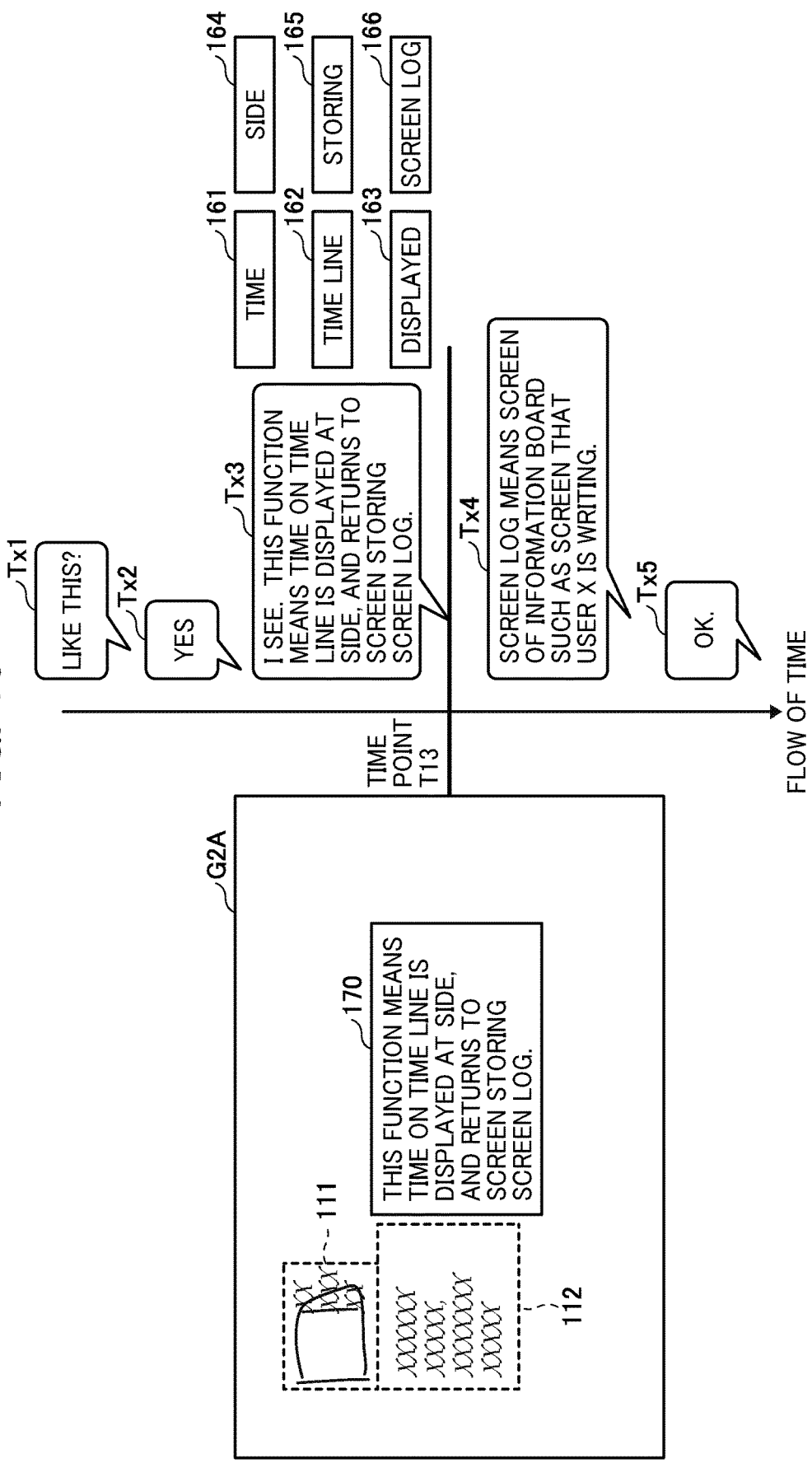
FIG. 16 illustrates a scheme of comparing stroke information and word.

FIG. 16 illustrates an example of converting the stroke information included in the screen drawing data 2, corresponding to the image G2 (see FIG. 9, FIG. 17), into the second text data.

In this example case of FIG. 16, in the conference information analysis unit 260, the speaker identification unit 261 extracts the time information indicating the time point T13 from the screen drawing data 2, and the audio data extraction unit 262 extracts the audio data that was collected during a given data-acquiring period K (see FIG. 9) including a period before the time point T13 and a period after the time point T13 by setting the time point T13 as the center of the given data-acquiring period K.

In this configuration, the given data-acquiring period K can be set by an administrator or the like of the conference management server 200 in advance.

In an example case of FIG. 16, each audio data extracted during the given data-acquiring period K is referred to as speech data Sp1 to Sp4 (see FIG. 9). The speech data Sp1 is audio data having the highest sound volume among the audio data collected at the time point T1 by the electronic information board 400. The audio data having the highest sound volume is likely to be spoken by a participant who is at the position closest to the electronic information board 400. Therefore, in an example case of FIG. 16, the speaker of the speech data Sp1 is assumed as the user X.

The speech data Sp2 is audio data having the highest sound volume among the audio data collected at the time point T2 by the terminal apparatus 500-2. Therefore, a speaker of the speech data Sp2 is assumed as the user B who is at the position closest to the terminal apparatus 500-2.

Similarly, the speech data Sp3 is audio data having the highest sound volume among the audio data collected at the time point T3 by the electronic information board 400, and a speaker of the speech data Sp3 is assumed as the user X who is at the position closest to the electronic information board 400. Further, the speech data Sp4 is audio data having the highest sound volume among the audio data collected at the time point T4 by the terminal apparatus 500-1, and a speaker of the speech data Sp4 is assumed as the user A who is at the position closest to the terminal apparatus 500-1.

Then, the speech data Sp1 to Sp4 are transmitted to the language processing apparatus 300 together with the request for converting the speech data Sp1 to Sp4 into the text data (i.e., first text data).

Then, the conference information analysis unit 260 acquires the text data (i.e., first text data) from the language processing apparatus 300. In an example case of FIG. 16, the speech data Sp1 is converted into the first text data indicated by Tx1, and the speech data Sp2 is converted into the first text data indicated by Tx2. Further, the speech data Sp3 is converted into the first text data indicated by Tx3, and the speech data Sp4 is converted into the first text data indicated by Tx4.

In an example case of FIG. 16, the first text data corresponding to the speech data, collected at the time point that is the closest to the time point T13 acquired from the screen drawing data 2, is specified as the first text data Tx3.

When the first text data Tx3 is specified, a word 161 of "time," a word 162 of "timeline," a word 163 of "displayed," a word 164 of "side," a word 165 of "storing", and a word 166 of "screen log" are extracted from the first text data Tx3.

In the embodiment, the conference information analysis unit 260 compares the image 112 drawn by the stroke information included in the screen drawing data 2 and a word. For example, the conference information analysis unit 260 compares the image 112 drawn by the stroke information corresponded to the screen drawing data 2 and the first word such the word 161 of "time."

In this comparing process, the word 161 of "time" is a string of four characters (i.e., "time" is configured by four characters of "t, i, m, e"). Therefore, the conference information analysis unit 260 recognizes the first four characters indicated by the stroke information in the image 112 by applying, for example, a handwritten character recognition technique, and then determines whether the word 161 of "time" matches the first four characters indicated by the stroke information.

If the word 161 of "time" matches the first four characters indicated by the stroke information, the conference information analysis unit 260 retains the word 161 of "time" as a word included in the string of characters drawn as the image 112.

The conference information analysis unit 260 also performs the above-described processing for the word 162 and other words one by one.

In an example case of FIG. 16, it is confirmed that the words 161 to 166 are included in the stroke information indicating the image 112. Therefore, the text data generation unit 269 generates a second text data 170 based on the words 161 to 166.

In this example case, the text data generation unit 269 can generate the second text data 170 by referencing, for example, the first text data Tx3. Specifically, the first text data Tx3 includes a word of "at" between the word 163 of "displayed" and the word 164 of "side" in the first text data Tx3. Therefore, the word of "at" is inserted between the word 163 of "displayed" and the word 164 of "side" by the text data generation unit 269.

The generated second text data 170 can be displayed near the image 112, which is illustrated as an image G2A in FIG. 16, in which the second text data 170 may be displayed by setting a brightness level of the second text data 170 different from a brightness level of the images 111 and 112. For example, the second text data 170 can be displayed with the brightness level lower than the brightness level of the images 111 and 112, or with the brightness level higher than the brightness level of the images 111 and 112.

FIG. 17 illustrates an example of the second text data 170 displayed on the electronic information board 400. For example, when the user X using the electronic information board 400 confirms the second text data 170, the image 112 can be replaced with the second text data 170 as illustrated in an image G2-1, in which the image 112 is not displayed.

Further, as to the electronic information board 400, the image G2 can be displayed on the touch panel, and then when the second text data 170 is generated, the image G2-1 can be displayed on the touch panel with the image 112.

Further, in the embodiment, the contents of the second text data 170 can be changed or modified by manually overwriting one or more characters on the second text data 170. In the embodiment, a software keyboard for modifying or changing the second text data 170 can be displayed on the image G2-1.

Further, in the embodiment, for example, an operation part (e.g., operation icon, button) used for confirming the second text data 170 can be displayed for the image G2-1 displaying the second text data 170, in which when the operation part is operated, the electronic information board 400 transmits the second text data 170 associated with the screen drawing data 2 to the conference management server 200. Further, the conference management server 200 can be configured to store the second text data 170 associated with the screen drawing data 2 as the conference information in the conference information DB 220.

As to the above-described embodiment, the recognition or identification of one or more characters input by a handwriting operation to the electronic information board 400 can be assisted.

The above-described information processing apparatus, method of processing information, and information processing system can support recognition or identification of characters input by a handwriting operation.

Numerous additional modifications and variations are possible in light of the above teachings. It is therefore to be understood that, within the scope of the appended claims, the disclosure of this patent specification may be practiced otherwise than as specifically described herein.

As can be appreciated by those skilled in the computer arts, this invention may be implemented as convenient using a conventional general-purpose digital computer programmed according to the teachings of the present specification. Appropriate software coding can readily be prepared by skilled programmers based on the teachings of the present disclosure, as will be apparent to those skilled in the software arts. The present invention may also be implemented by the preparation of application-specific integrated circuits or by interconnecting an appropriate network of conventional component circuits, as will be readily apparent to those skilled in the relevant art.

Each of the functions of the described embodiments may be implemented by one or more processing circuits. A processing circuit includes a programmed processor. A processing circuit also includes devices such as an application specific integrated circuit (ASIC) and conventional circuit components arranged to perform the recited functions.

What is claimed is:

1. An information processing apparatus comprising:
    a memory to store drawing data including stroke information, generated in response to a handwriting operation on an input device disposed for an image drawing apparatus, and to store audio data collected by a terminal apparatus, the audio data being stored in association with user identification information identifying a user of the terminal apparatus; and
    circuitry to
        acquire, from the memory, the drawing data acquired at a specific time point, and acquire the audio data collected in a data-acquiring period, the data-acquiring period including the specific time point when the drawing data is acquired,
        transmit the audio data, and a request for converting the audio data acquired, to a language processing apparatus, for conversion of the audio data into first text data,
        acquire the first text data from the language processing apparatus,
        compare stroke information of the drawing data acquired and the first text data acquired, to determine whether the stroke information of the drawing data acquired matches the first text data, and
        convert handwritten-information indicated by the stroke information to second text data, upon the stroke information being determined to match the first text data.

2. The information processing apparatus of claim 1,
    wherein the first text data includes a plurality of items of first text data, each one of the plurality of items of first text data respectively generated from a respective plurality of items of audio data collected at different time points during the data-acquiring period including the specific time point, and wherein
    the circuitry is configured to sequentially compare a stroke indicated by the stroke information of the drawing data acquired and each one of the plurality of items of first text data, in sequential order from the first text data generated from the audio data collected at time point, of the different time points relatively closest to the specific time point, to determine whether the stroke of the stroke information of the drawing data acquired matches the first text data.

3. The information processing apparatus of claim 2,
    wherein the circuitry is configured to extract a word included in the first text data, is configured to compare the word extracted and a part of the stroke indicated by the stroke information, is configured to determine whether the part of the stroke indicated by the stroke information matches a string of characters configuring the word extracted, and is configured to generate the second text data, using the word extracted, upon a match to the part of the stroke by the stroke information being determined.

4. The information processing apparatus of claim 1, wherein upon the terminal apparatus receiving audio data of a plurality of users, the terminal apparatus is configured to collect audio data having a relatively highest sound volume, among the audio data of the plurality of users, as the audio data collected by the terminal apparatus.

5. The information processing apparatus of claim 1,
    wherein upon the circuitry starting to receive a signal of one handwriting operation on the input device at one time point and upon the circuitry ceasing to receive the signal of the one handwriting operation on the input device at another time point, the circuitry is configured to acquire information of coordinates of a profile drawn by the one handwriting operation as the stroke information, upon no signal being received in a time length counted from the another time point.

6. An information processing system, comprising:
    a plurality of apparatuses, at least one of the plurality of apparatuses including:
        a memory to store drawing data including stroke information, generated in response to a handwriting operation on an input device disposed for an image drawing apparatus, and to store audio data collected by a terminal apparatus, the audio data being stored in association with user identification information identifying a user of the terminal apparatus; and
        circuitry to
            acquire, from the memory, the drawing data acquired at a specific time point, and acquire the audio data collected in a data-acquiring period, the data-acquiring period including the specific time point when the drawing data is acquired,
            transmit the audio data, and a request for converting the audio data acquired, to a language processing apparatus, for conversion of the audio data into first text data, acquire the first text data from the language processing apparatus,
compare stroke information of the drawing data acquired and the first text data acquired, to determine whether the stroke information of the drawing data acquired matches the first text data, and
convert handwritten-information indicated by the stroke information to second text data, upon the stroke information being determined to match the first text data.

7. The information processing system of claim 6, wherein each of the plurality of apparatuses includes an image drawing apparatus identical to the image drawing apparatus.

8. A method of processing information by a plurality of apparatuses comprising:
storing drawing data including stroke information in a memory, generated in response to a handwriting operation on an input device disposed for an image drawing apparatus, and storing audio data collected by a terminal apparatus, the audio data being stored in the memory, in association with user identification information identifying a user of the terminal apparatus;
acquiring, from the memory, the drawing data acquired at a specific time point and acquiring, from the memory, the audio data collected in a data-acquiring period, the data-acquiring period including the specific time point when the drawing data is acquired;
transmitting the audio data, and a request for converting the audio data acquired, to a language processing apparatus, for conversion of the audio data into first text data;
acquiring the first text data from the language processing apparatus;
comparing stroke information of the drawing data acquired and the first text data acquired, to determine whether the stroke information of the drawing data acquired matches the first text data; and
converting handwritten-information indicated by the stroke information to second text data, upon the stroke information being determined to match the first text data.

9. The information processing apparatus of claim 1,
wherein the circuitry is configured to extract a word included in the first text data, is configured to compare the word extracted and a part of the stroke indicated by the stroke information, is configured to determine whether the part of the stroke indicated by the stroke information matches a string of characters configuring the word extracted, and is configured to generate the second text data, using the word extracted, upon a match to the part of the stroke by the stroke information being determined.

10. The information processing system of claim 6,
wherein the first text data includes a plurality of items of first text data, each one of the plurality of items of first text data respectively generated from a respective plurality of items of audio data collected at different time points during the data-acquiring period including the specific time point, and
wherein the circuitry, of at least one of the plurality of apparatuses, is configured to sequentially compare a stroke, indicated by the stroke information of the drawing data acquired and each one of the plurality of items of first text data, in sequential order from the first text data generated from the audio data collected at time point, of the different time points relatively closest to the specific time point, to determine whether the stroke of the stroke information of the drawing data acquired matches the first text data.

11. The information processing system of claim 6,
wherein the circuitry, of at least one of the plurality of apparatuses, is configured to extract a word included in the first text data, is configured to compare the word extracted and a part of the stroke indicated by the stroke information, is configured to determine whether the part of the stroke indicated by the stroke information matches a string of characters configuring the word extracted, and is configured to generate the second text data, using the word extracted, upon a match to the part of the stroke by the stroke information being determined.

12. The information processing system of claim 10,
wherein the circuitry, of at least one of the plurality of apparatuses, is configured to extract a word included in the first text data, is configured to compare the word extracted and a part of the stroke indicated by the stroke information, is configured to determine whether the part of the stroke indicated by the stroke information matches a string of characters configuring the word extracted, and is configured to generate the second text data, using the word extracted, upon a match to the part of the stroke by the stroke information being determined.

13. The information processing system of claim 6, wherein upon the terminal apparatus receiving audio data of a plurality of users, the terminal apparatus is configured to collect audio data having a relatively highest sound volume, among the audio data of the plurality of users, as the audio data collected by the terminal apparatus.

14. The information processing system of claim 6,
wherein upon the circuitry starting to receive a signal of one handwriting operation on the input device at one time point and upon the circuitry ceasing to receive the signal of the one handwriting operation on the input device at another time point, the circuitry, of at least one of the plurality of apparatuses, is configured to acquire information of coordinates of a profile drawn by the one handwriting operation as the stroke information, upon no signal being received in a time length counted from the another time point.

15. The method of claim 8,
wherein the first text data includes a plurality of items of first text data, each one of the plurality of items of first text data respectively generated from a respective plurality of items of audio data collected at different time points during the data-acquiring period including the specific time point, and
wherein the comparing includes sequentially comparing a stroke, indicated by the stroke information of the drawing data acquired, and each one of the plurality of items of first text data, in sequential order from the first text data generated from the audio data collected at time point, of the different time points relatively closest to the specific time point, to determine whether the stroke of the stroke information of the drawing data acquired matches the first text data.

16. The method of claim 8, further comprising:
extracting a word included in the first text data;
comparing the word extracted and a part of the stroke indicated by the stroke information;
determining whether the part of the stroke indicated by the stroke information matches a string of characters configuring the word extracted; and generating the second text data, using the word extracted, upon a match to the part of the stroke by the stroke information being determined.

17. The method of claim 15, further comprising:
extracting a word included in the first text data;
comparing the word extracted and a part of the stroke indicated by the stroke information;
determining whether the part of the stroke indicated by the stroke information matches a string of characters configuring the word extracted; and
generating the second text data, using the word extracted, upon a match to the part of the stroke by the stroke information being determined.

18. The method of claim 8, further comprising:
collecting, upon the terminal apparatus receiving audio data of a plurality of users, audio data having a relatively highest sound volume, among the audio data of the plurality of users, as the audio data collected by the terminal apparatus.

19. The method of claim 8, further comprising:
starting to receive a signal of one handwriting operation on the input device at one time point; and
acquiring, upon ceasing to receive the signal of the one handwriting operation on the input device at another time point, information of coordinates of a profile drawn by the one handwriting operation as the stroke information, upon no signal being received in a time length counted from the another time point.

20. The information processing apparatus of claim 1, wherein the information processing apparatus is an interactive whiteboard board.

21. An information processing apparatus comprising:
a memory to store drawing data including stroke information and to store audio data collected by a terminal apparatus in association with user identification information identifying a user of the terminal apparatus; and
circuitry to
transmit the audio data, and a request for converting the audio data, to a language processing apparatus, for conversion of the audio data into first text data,
acquire the first text data from the language processing apparatus,
acquire information of coordinates of a profile drawn by the one handwriting operation as the stroke information, upon ceasing to receive the signal of the one handwriting operation on the input device at another time point and upon no signal being received for a threshold time length counted from the another time point,
compare the information acquired and the first text data acquired, to determine whether the information acquired matches the first text data acquired, and
convert information of coordinates of a profile drawn by the one handwriting operation to second text data, upon the information being determined to match the first text data.

22. An information processing system, comprising:
a plurality of apparatuses, at least one of the plurality of apparatuses including: a memory to store drawing data including stroke information and to store audio data collected by a terminal apparatus in association with user identification information identifying a user of the terminal apparatus; and
circuitry to
transmit the audio data, and a request for converting the audio data, to a language processing apparatus, for conversion of the audio data into first text data,
acquire the first text data from the language processing apparatus,
acquire information of coordinates of a profile drawn by the one handwriting operation as the stroke information, upon ceasing to receive the signal of the one handwriting operation on the input device at another time point and upon no signal being received for a threshold time length counted from the another time point,
compare the information acquired and the first text data acquired, to determine whether the information acquired matches the first text data acquired, and
convert information of coordinates of a profile drawn by the one handwriting operation to second text data, upon the information being determined to match the first text data.

23. A method of processing information by a plurality of apparatuses comprising:
storing drawing data including stroke information in a memory;
storing audio data collected by a terminal apparatus in association with user identification information identifying a user of the terminal apparatus;
transmitting the audio data, and a request for converting the audio data, to a language processing apparatus, for conversion of the audio data into first text data;
acquiring the first text data from the language processing apparatus;
acquiring information of coordinates of a profile drawn by the one handwriting operation as the stroke information, upon ceasing to receive the signal of the one handwriting operation on the input device at another time point and upon no signal being received for a threshold time length counted from the another time point;
comparing the information acquired and the first text data acquired, to determine whether the information acquired matches the first text data acquired; and
converting information of coordinates of a profile drawn by the one handwriting operation to second text data, upon the information being determined to match the first text data.

* * * * *